United States Patent [19]

Ohya et al.

[11] Patent Number: 5,049,448
[45] Date of Patent: Sep. 17, 1991

[54] MAGNETIC RECORDING MEDIUM CONTAINING AN ESTER LUBRICANT BRANCHED FROM THE NUMBER 2 CARBON POSITION OF THE ACID RESIDUE

[75] Inventors: Takao Ohya; Yasuo Nishikawa; Jun Nakagawa; Fusao Yamanaka; Toshio Kawamata; Tsutomu Okita; Hiroshi Hashimoto; Mikihiko Kato, all of Kanagawa, Japan

[73] Assignee: Fuji Photo Film Co., Ltd., Kanagawa, Japan

[21] Appl. No.: 383,514

[22] Filed: Jul. 24, 1989

[30] Foreign Application Priority Data

| Jul. 22, 1988 | [JP] | Japan | 63-183345 |
| Aug. 22, 1988 | [JP] | Japan | 63-207548 |
| Aug. 23, 1988 | [JP] | Japan | 63-209187 |
| Oct. 4, 1988 | [JP] | Japan | 63-250333 |

[51] Int. Cl.$^5$ ............................................. G11B 23/00
[52] U.S. Cl. ................................. 428/409; 428/425.8; 428/425.9; 428/694; 428/695; 428/900
[58] Field of Search .............. 428/900, 694, 695, 409, 428/425.8, 425.9; 560/1, 129

[56] References Cited

U.S. PATENT DOCUMENTS

| 3,701,730 | 10/1972 | Daniels | 252/49.9 |
| 3,704,152 | 11/1972 | Hartmann et al. | 117/235 |
| 4,383,000 | 5/1983 | Fujiki | 428/522 |
| 4,383,001 | 5/1983 | Fujiki | 428/522 |
| 4,420,540 | 12/1983 | Ogawa et al. | 428/457 |
| 4,595,640 | 6/1986 | Chernega | 428/695 |
| 4,675,250 | 6/1987 | Kanai | 428/403 |
| 4,741,959 | 5/1988 | Abe et al. | 428/403 |
| 4,772,522 | 9/1988 | Kubota et al. | 428/328 |
| 4,786,551 | 11/1988 | Ootani et al. | 428/323 |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium is disclosed, comprising a nonmagnetic support having thereon a magnetic layer, wherein at least one of ester compounds represented by formula (I) is present in or on the magnetic layer,

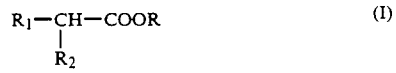

wherein $R_1$ represents a straight chain, saturated alkyl group having 6 to 12 carbon atoms, $R_2$ represents a straight chain, saturated alkyl group having 4 to 10 carbon atoms, and R represents a branched or straight chain alkyl group having 4 to 22 carbon atoms.

11 Claims, No Drawings

MAGNETIC RECORDING MEDIUM CONTAINING AN ESTER LUBRICANT BRANCHED FROM THE NUMBER 2 CARBON POSITION OF THE ACID RESIDUE

FIELD OF THE INVENTION

The present invention relates to a magnetic recording medium comprising a nonmagnetic support having thereon a magnetic layer comprising ferromagnetic particles and binders for the particles, or a ferromagnetic metal thin film, and more particularly, relates to a magnetic recording medium such as video tapes, audio tapes, computer tapes or floppy disks having excellent electromagnetic properties and running durability in the widely varied temperature and humidity.

BACKGROUND OF THE INVENTION

As higher recording density is required in magnetic recording, the surfaces of magnetic layer has been made smoother, and, therefore, a coefficient of friction in running between the magnetic layer and the parts of recording/reproducing device increases. As a result, it becomes marked problems that magnetic recording media are not smoothly run and that magnetic layers are damaged.

Recently, video tape recorders, personal computers and word processors have been commercially available and a magnetic recording medium for such uses has been used under various conditions, particularly in wide variety of temperature and humidity. In a rotary recording medium such as floppy disk which is used for personal computers and word processors, access and recess of the magnetic layer to the magnetic recording head are repeated many times. The running durability of the magnetic recording medium is big problem, particularly in such conditions that the recording medium is used at high temperature or between high temperature and low temperature for long time.

In order to solve the above problems in a so-called "coated type" magnetic recording medium comprising a magnetic layer containing ferromagnetic particles and a binder, a method for adding a fatty acid ester to a magnetic layer as described in JP-A-50-153905, JP-A-50-22603, JP-A-55-139637 (the term "JP-A" as used herein refers to a "published unexamined Japanese patent application"), JP-B-39-28367, JP-B-41-18065, and JP-B-47-12950 (the term "JP-B" as used herein refers to an "examined Japanese patent publication"); a method for adding a silicone compound to a magnetic layer as described in U.S. Pat. No. 2,654,681; and a method for adding a fatty acid or hydrocarbon to a magnetic layer have been proposed.

However, in these conventional methods, the above additives are easily vaporized from the surface of magnetic layer at high temperature, and deposited on the surface of magnetic layer at low temperature to cause head clogging and to increase dropouts. On the other hand, if an amount of the additives added is increased, the strength of magnetic layer is weakened because the binder in the magnetic layer is plasticized, and the durability of the magnetic layer is decreased.

Further, if an ester compound having a straight chain alkyl group, which has superior lubricating property is used, it is often deposited on the surface of the magnetic layer at low temperature, because it has a high melting point.

In order to resolve the above problems, it is disclosed in JP-B-47-12950, JP-A-58-160425, JP-A-58-218038, JP-A-60-205827, JP-A-61-294637, JP-A-62-117141 and JP-A-62-125529 that a fatty acid ester having a high molecular and a branched hydrocarbon group or an unsaturated hydrocarbon group is added to the magnetic recording layer, so that it hardly vaporizes from the layer at high temperature and it is not deposited on the surface of the magnetic layer at low temperature. However, no sufficient results have been obtained by these esters which are liquid at normal temperature, because the binder is plasticized by the esters having its miscibility with the binder, whereby the strength of the layer is decreased. And no sufficient lubricating property is provided by the ester compounds having an alkyl group.

Particularly, the defects caused by the ester compounds are serious problems in disk-form magnetic recording medium such as floppy disk which is used in such system that access of magnetic head in personal computers or word processors to magnetic layer of the medium is repeated many times, because the strength of the magnetic layer is decreased (i.e., tape durability is decreased and sufficient record/reproduction is not accomplished).

The problems of conventional methods as described above are more acute, as the surface of magnetic recording medium is more smooth. For example, in the coated type magnetic recording medium, when the polymer having a polar group capable of accelerating dispersion of the ferromagnetic particles is used as the binder as disclosed in JP-A-57-133521, JP-A-57-44227, JP-A-60-238309 and JP-A-61-104329, the problems are more serious because surface roughness of the magnetic layer becomes not more than 0.01 μm.

Accordingly, the preparation of the magnetic recording medium having the magnetic layer with an excellent surface roughness and not having the above problems has been desired.

As binders used for the magnetic recording medium, it has been proposed in U.S. Pat. Nos. 4,409,299, 4,431,700, 4,510,203, 4,429,017, 4,439,486 and 4,568,613 to use thermoplastic resins such as a vinyl chloride-vinyl acetate copolymer, a vinyl chloride-vinylidene chloride copolymer, a cellulose resin, an acetal resin or a urethane resin, alone or in combination. However, these resins do not provide the magnetic layer with sufficient abrasion resistance and, therefore, do not satisfy the requirement of magnetic recording medium having better running durability. On the other hand, it has been proposed in U.S. Pat. Nos. 3,597,273, 4,154,895, 4,409,291, 4,587,170, 4,049,871, 4,336,308, 4,411,956, 4,784,907, 4,068,040, 4,333,988 and 4,431,721 to use thermosetting resins such as a melamine resin or a urea resin, and to add crosslinkable binders such as an isocyanate compound or an epoxy ring-containing compound to the thermoplastic resins as described above. These resins provide the magnetic layer with better abrasion resistance and comparatively improved running durability. Further, it is proposed in the above references to introduce polar groups such as —COOH, —SO$_3$M or —PO$_3$M$_2$ in the molecule in order to accelerate dispersion of ferromagnetic particles, whereby magnetic recording medium having excellent electromagnetic properties is obtained. However, the use of the crosslinkable binders provides such disadvantage that uniform physical properties of ferromagnetic particles as coating composition are not kept because of worse storage stability of a ferromagnetic particle dispersion, and therefore, uniform characteristics of magnetic recording medium are not maintained, and that a thermal processing step is required to harden the coated magnetic layer after coating and drying the coating composition. As the binder which is not accompanied by the disadvantages, a method for using oligomer or monomer of acrylic acid ester and hardening it by radiation exposure after drying it is disclosed in JP-B-47-12423 and JP-A-47-13639, JP-A-47-150104, JP-A-50-77433 and JP-A-56-25231. According to the method, a magnetic recording medium having excellent abrasion resistance can be obtained without having the procedural disadvantages as described above. However, a magnetic recording medium having both better electromagnetic properties suitable for high recording density and better running durability is not sufficiently obtained by the method.

SUMMARY OF THE INVENTION

An object of the present invention is to improve the problems of conventional techniques as described above.

Another object of the present invention is to provide a tape-form or disk-form magnetic recording medium (particularly, floppy disk) having excellent electromagnetic properties, lubricating properties of a magnetic layer to a magnetic head, running durability and tape durability under wide variety of environmental conditions, and surface smoothness.

A further object of the present invention is to provide a magnetic recording medium having excellent uniformity of properties due to good storage stability of coating composition which is manufactured without thermal processing step for hardening the coated layer.

In order to solve the above problems, the present inventor has found that a high molecular ester having a branched alkyl group at the 2-position of acid residue of the ester or of alcohol residue of the ester, and a high molecular ester having a branched methyl group at the acid residue of the ester is useful as a lubricating agent.

Accordingly, the objects of the present invention can be attained by a magnetic recording medium comprising a nonmagnetic support having thereon a magnetic layer, wherein at least one of ester compounds represented by formula (I) is present in or on the magnetic layer,

wherein $R_1$ represents a straight chain, saturated alkyl group having 6 to 12 carbon atoms, $R_2$ represents a straight chain, saturated alkyl group having 4 to 10 carbon atoms, and R is a branched or straight chain alkyl group having 4 to 22 carbon atoms.

DETAILED DESCRIPTION OF THE INVENTION

The ester compound represented by formula (I) of the present invention has an alkyl group having not less than 6 carbon atoms and an alkyl group having not less than 4 carbon atoms at the 2-position of the fatty acid portion. The ester compound can provide lubricating effects in liquid state, because it is hardly crystallized at lower temperature, and does not vaporize from the surface of magnetic layer at high temperature, because the number of carbon atoms of fatty acid portion and alcohol portion in the molecule is limited to some extent. Namely, according to the present invention, it is possible to provide magnetic recording medium having excellent running durability under wide variety of environmental conditions by introducing a branched alkyl group into the fatty acid portion of the ester compound, and by providing the alkyl group with a certain range of carbon atoms and further by providing the alcohol portion of the ester with a certain range of carbon atoms. Where a magnetic recording medium of the present invention is a so-called "coated type" magnetic recording medium comprising a magnetic layer containing mainly ferromagnetic particles and binders, the compatibility of the ester compound with the binders is comparatively small because of molecular structure branched in the 2-position of the fatty acid portion, and plasticization of the binder is less possible. It does not happen that the amount of the ester compound which acts as the lubricating agent on the surface of the magnetic layer reduces because the ester compound is not completely withheld in the binders for the magnetic layer. Accordingly, the ester compound can provide the magnetic layer having an excellent lubricating property. For example, according to the magnetic recording medium of the present invention, an initial driving torque (adsorption torque) of floppy disk drive can be small.

Although the substituent "R" of alcohol portion in the ester compound of the present invention represented by formula (I) is not limited, so long as it is a branched or straight chain alkyl group having 4 to 22 carbon atoms, it has preferably straight chain structure because the lubricating property is decreased due to high viscosity, if it has a branched structure.

The number of carbon atoms in the fatty acid portion of the ester compound represented by formula (I) is 6 to 12 and preferably 6 to 8 for the substituent "$R_1$" and 4 to 10 and preferably 4 to 6 for the substituent "$R_2$". If the number of carbon atoms for the substituents is larger than the upper limit, it is not preferred because the lubricating property is decreased by an increased viscosity, and because the initial driving torque is increased. Further, the number of carbon atoms in R is 4 to 22 and preferably 10 to 18.

Further, the ester compound represented by formula (I) having the fatty acid portion branched at the 2-position thereof has lower viscosity and melting point than those of ester compound having the fatty acid portion at the position other than 2-position, and, therefore, it has a better lubricating property and durability at low temperature.

The typical examples of the ester compounds represented by formula (I) include butyl 2-tetraoctanate, butyl 2-pentanonanate, butyl 2-hexyldecanate, butyl 2-heptylundecanate, butyl 2-octyldodecanate, butyl 2-decyltetradecanate, octyl 2-tetraoctanate, octyl 2-pentanonanate, octyl 2-hexyldecanate, octyl 2-heptylundecanate, octyl 2-octyldodecanate, octyl 2-decyltetradecanate, lauryl 2-tetraoctanate, lauryl 2-pentanonanate, lauryl 2-hexyldecanate, lauryl 2-heptylundecanate, lauryl 2-octyldodecanate, lauryl 2-decyltetradecanate, palmityl 2-tetraoctanate, palmityl 2-pentanonanate, palmityl 2-hexyldecanate, palmityl 2-heptylundecanate, palmityl 2-octyldodecanate, palmityl 2-decyltetradecanate, hexadecyl 2-tetraoctanate, hexadecyl 2-pentanonanate, hexadecyl 2-hexyldecanate, hexadecyl 2-heptylundecanate, hexadecyl 2-octyldodecanate, hexadecyl 2-decyltetradecanate, stearyl 2-tetraoctanate, stearyl 2-pentanonanate, stearyl 2-hexyldecanate, stearyl 2-heptylundecanate, stearyl 2-octyldodecanate, stearyl 2-decyltetradecanate, isostearyl 2-tetraoctanate, isostearyl 2-pentanonanate, isostearyl 2-hexyldecanate, isostearyl 2-heptylundecanate, isostearyl 2-octyldodecanate and isostearyl 2-decyltetradecanate. Among these compounds, the ester compounds having a molecular weight of preferably not less than 430 and more preferably 500 to 800 are particularly effective to achieve the objects of the present invention.

Instead of the ester compound represented by formula (I), a compound represented by formula (II) can be also used in the present invention,

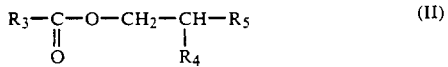

wherein $R_3$ represents a straight chain or branched alkyl or alkenyl group having 15 to 29 carbon atoms, preferably 17 to 21 carbon atoms and more preferably 17 carbon atoms; $R_4$ and $R_5$ each represents an alkyl group and particularly $R_4$ is an alkyl group having preferably 5 to 19 carbon atoms and more preferably 4 to 9 carbon atoms and $R_5$ is an alkyl group having preferably 8 to 13 carbon atoms and more preferably 8 to 11 carbon atoms; and the total carbon atoms of $R_4$ and $R_5$ are 14 to 20, preferably 14 to 16, and more preferably 16.

The ester compound represented by formula (II) used in the present invention can be prepared by condensation of a fatty acid having 18 to 30 carbon atoms, which may be isomer structure (i.e., a branched or straight chain structure), saturated form or unsaturated form. And the alcohol portion is a branched alcohol which is called as Guerbet alcohol or D alcohol. As the number of carbon atoms in the ester compound represented by formula (II) is larger, volatility of it is decreased and durability at high temperature is increased, however, the initial driving torque increases. Accordingly, the number of carbon atoms of the alcohol portion is preferably 16 to 22 in order to keep good balance of the durability and the initial driving torque. The characteristics of magnetic recording medium are varied by a combination of the number of carbon atoms of the alcohol portion and the number of carbon atoms of the fatty acid portion. For example, when the alcohol portion has 16 carbon atoms, preferable carbon atoms of the fatty acid portion are 20 to 30 and more preferably 20 to 26. When the alcohol portion has 18 carbon atoms, preferable carbon atoms of the fatty acid portion is 18 to 28 and more preferably 18 to 22. The ester compound having 18 carbon atoms in the alcohol portion and 18 carbon atoms in the fatty acid portion provides more excellent results. If the number of carbon atoms in the alcohol portion is less 14 or more than 22, a magnetic recording medium having both good durability and good initial driving torque cannot be obtained.

The examples of the fatty acid portions of the ester compounds represented by formula (II) include a straight chain or branched alkyl group such as octadecyl, nonadecyl, eicosyl, heneicosyl, docosyl, tricosyl, tetracosyl or tetraacontyl, and a straight chain or branched alkenyl group such as octadecenyl, nonadecenyl, eicosenyl, heneicosenyl, docosenyl, tricosyl, and tetracosenyl. The examples of the alcohol portion include 2-hexyldecyl alcohol, 2-heptylundecyl alcohol and 2-octyldodecyl alcohol.

Of the above ester compounds, 2-hexyldecyl stearate, 2-heptylundecyl stearate, 2-hexyldecyl behenate, 2-hexyldecyl montanate, 2-heptylundecyl arachinate, 2-heptylundecyl behenate, and octyldodecyl stearate are preferred in order to sufficiently accomplish the objects of the present invention. The most preferred ester compound is hexyldecyl stearate.

Among these ester compounds represented by formula (II), the ester compound having a molecular weight of preferably 430 to 800 and more preferably 500 to 800 are preferred.

In the present invention, the compound represented by formula (III) can be preferably used instead of the ester compound represented by formula (I),

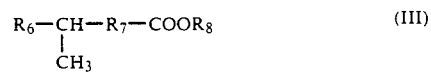

wherein $R_6$ represents a straight chain alkyl group having 1 to 17 carbon atoms; $R_7$ represents a straight chain alkyl group having 1 to 17 carbon atoms; $R_8$ represents a straight chain or branched alkyl group having 4 to 22 carbon atoms and preferably 12 to 22 carbon atoms; and total carbon atoms of $R_6$ and $R_7$ are 10 to 25 and preferably 12 to 22.

The ester compound of the present invention represented by formula (III) has a branched alkyl group having certain carbon atoms in the fatty acid portion thereof, and has a branched or straight chain alkyl group having certain carbon atoms in the fatty acid residue. This structural feature of the ester compound of the present invention provides a magnetic recording medium of the present invention with the following advantages. First, the ester compound can provide lubricant effects in liquid state, because it is hardly crystallized even at a comparatively lower temperature due to a branched structure in the fatty acid residue, and is not vaporized from the surface of the magnetic layer even at a high temperature, because the number of carbon atoms of the fatty acid residue and alcohol portion in the molecule is limited to some extent. Therefore, it has become possible to provide a magnetic recording medium having excellent durability under wide variety of environmental conditions. Second, the ester compound can provide lubricant effects even at a lower temperature due to its comparatively low viscosity, as the ester compound has a branched hydrocarbon group, but $R_6$ and $R_7$ in the formula (III) are straight chain, not branched alkyl groups. As described, the ester compound represented by formula (III) used in the present invention can provide comparatively large lubricant effects as a lubricating agent for a magnetic recording medium, and such lubricant effects can be retained even at a wide temperature range. Those advantages have not been provided by a conventional lubricating agent.

The ester compound represented by formula (III) and used in the present invention is generally obtained as a by-product upon preparing a dimer acid which is called methyl branched fatty acid or isomerized fatty acid. It is commercially available, for example, in the name of isostearic acid #871 and #875, manufactured by Emery Co., Ltd.

The number of carbon atoms in the fatty acid residual group of the ester compound represented by formula (III) is from 1 to 17 for $R_6$ and is from 1 to 17 for $R_7$. If the number increases, lubricating effect decreases and the initial driving torque increases due to the increased viscosity, which is not preferred.

It is further preferred that the number of total carbon atoms of $R_6$ and $R_7$ is from 10 to 25 and preferably from 12 to 22. When it is less than 10, the ester compound tends to easily vaporize at a high temperature, because the molecular weight becomes smaller. When it exceeds 25, lubricating effects decreases, because the viscosity increases at a low temperature, which is not preferred.

The ester compound represented by formula (III) which is used in the present invention is the mixture with various combinations of (n, m) having the equation "n+m=14". The following ester compounds are illustrated when the center of the distribution is "n=m=7".

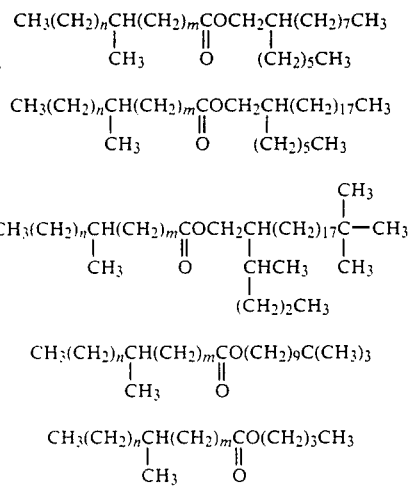

The following ester compounds are illustrated, when it is the mixture with various combinations of (n, m) having the equation "n+m=10", and the center of the distribution is "n=m=5".

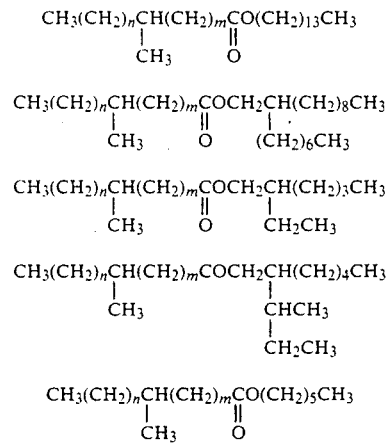

Among the ester compounds represented by formula (III), the ester compound having a molecular weight of 430 or more and preferably 500 to 800 is the most effective to attain the objects of the present invention.

A fatty acid which is a material for the ester compounds represented by formulae (I), (II) or (III) which are used in the present invention is synthesized by oxidizing aliphatic alcohol which is obtained by the method of Guerbet and is, for example, commercially available in the trade name of "Diadole 18G" (2-heptylundecanol) manufactured by Mitsubishi Chemical Industries, Ltd.

In the present invention, the ester compounds represented by formulae (I), (II) or (III) are used in a ratio of preferably from 1 to 25 wt % and more preferably from 2 to 20 wt % based on the ferromagnetic particles. The ester compounds can be topcoated on the surface of the magnetic layer mainly comprising ferromagnetic particles and binders. In this case, the amount of the ester compound to be topcoated is preferably from 0.5 to 100 mg/m$^2$ and most preferably from 2 to 50 mg/m$^2$. When the amount thereof exceeds the above range, the excessive amount of the ester compound undesirably tends to cause adhesion, or to plasticize the binder, whereby the film quality of the magnetic layer is degraded and running durability is, as a result, decreased. When the amount thereof is too small, sufficient effects cannot be obtained, and the object of the present invention cannot be achieved.

In the present invention, in order to retain the ester compounds represented by formulae (I), (II) or (III) used in the magnetic layer, the ester compounds are added into the magnetic layer, or are topcoated on the surface of the magnetic layer. When the magnetic layer is a ferromagnetic metal thin film, the ester compound is generally topcoated on the surface of the magnetic layer.

As the methods for topcoating the ester compounds, there are a method where the ester compound is dissolved in a solvent and the resulting solution is coated or sprayed on the magnetic layer; a method where a support is soaked in the above solution so that the ester compound is adsorbed on the surface of the support; a method where the ester compound is fused and melted and is coated on a support; and a method where the ester compound is topcoated on the magnetic layer by Langmuir-Blodgett method.

The present invention is effective also for the metal thin film type magnetic recording medium having very small surface roughness of a magnetic layer. That is, the running durability of the metal thin film type magnetic recording medium can effectively be improved by topcoating the ester compounds represented by formulae (I), (II) or (III) on the ferromagnetic metal thin film which is prepared by a thin film forming method such as a vacuum evaporation method or a sputtering method. In this case, the amount of the ester compound to be coated on the surface of the film is preferably from 0.5 to 100 mg/m$^2$ and more preferably from 2 to 50 mg/m$^2$.

As materials for preparing a ferromagnetic metal thin film, there are ferromagnetic metals such as iron, cobalt, nickel and the like, and ferromagnetic alloys such as Fe-Co, Fe-Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W, Co-Ni-Re and the like. The ferromagnetic metal thin film is formed from the above materials by an electroplating method, an electroless plating method, a gas phase plating method, a sputtering method, a vapor deposition method or an ion plating method. The film thickness is in the range of from 0.02 to 2 μm and particularly preferably from 0.05 to 0.4 μm, when the film is used for a magnetic recording medium.

When a thin metal film is formed, for example, when a metal thin film is formed by a vapor deposition method in an oxygen gas flow, the electromagnetic characteristics and durability can be improved by introducing oxygen into the ferromagnetic metal thin films. In addition to oxygen, N, Cr, Ga, As, Sr, Zr, Nb, Mo, Rh, Pd, Sn, Sb, Te, Pm, Re, Os, Ir, Au, Hg, Pb and Bi may be contained in the film.

The surface condition of the above magnetic layer has not been particularly defined, but when the surface has a protrusion having a height of from 1 to 500 nm (nm: nanometer $= 10^{-9}$ meter), the running durability is particularly improved.

The thickness of the support of the above metal thin film type magnetic recording medium is particularly preferably from 4 to 50 $\mu$m. An undercoating layer may be provided on the support to more closely contact the ferromagnetic metal thin film and to improve the magnetic properties.

The present invention is particularly effective for the so-called coated type magnetic recording medium having a magnetic layer mainly comprising ferromagnetic particles and binders. This is why the ester compounds represented by formulae (I), (II) or (III) do not have strong affinity with the binder, and, therefore, the decrease of the film quality of the magnetic layer, which is caused by plasticizing the binder, does not take place. When the ferromagnetic particles are Co-modified iron oxide or ferromagnetic metal particles, the surface of the magnetic layer is smooth, and running durability tends to decrease. Accordingly, the present invention is effective in this case. As ferromagnetic particles used for the coated type magnetic recording medium, there are $\gamma$-$Fe_2O_3$, $Fe_3O_4$, Co-modified iron oxide, $CrO_2$, iron nitride, iron carbide, modified barium ferrite, and modified strontium ferrite. The shape of the ferromagnetic particles is not particularly limited. The acicular shape, the grain shape, the dice shape, the rice grain shape and the plate shape can be used. Regarding the size of the particle, the particle having a specific surface area of 10 $m^2/g$ or more is preferred in view of electromagnetic characteristics.

When the ferromagnetic particles are ferromagnetic metal particles, it is desirable that the coercive force (Hc) thereof is 800 Oe or more, saturation magnetization ($\sigma$s) is 100 emu/g or more and the specific surface area is 30 $m^2/g$ or more.

The acicular ratio of ferromagnetic iron oxide and chromium dioxide is generally 2 or more, preferably from 2/1 to 20/1, more preferably 4/1 to 20/1 and most preferably 5/1 or higher. The effective average length thereof is in the range of from 0.2 to 2.0 $\mu$m. The ferromagnetic alloy particles have a metal content of 75 wt % or more, and 80 wt % or more of the metal content is ferromagnetic metal particle having a long diameter of about 1.0 $\mu$m or less. The ferromagnetic metals include Fe, Co, Ni, Fe-Ni, Co-Ni and Fe-Co-Ni. The most effective ferromagnetic particles in the present invention are the fine particles which are difficult to disperse, that is, the ferromagnetic alloy particles having a crystal size of 400 Å or less, and preferably 200 Å or less.

The binder which forms a magnetic layer can be selected from the generally used binders. Examples of the binders include vinyl chloride/vinyl acetate copolymers, vinyl chloride, vinyl acetate, vinyl alcohol, maleic acid and/or acrylic acid copolymers, vinyl chloride/vinylidene chloride copolymers, vinyl chloride/acrylonitrile copolymers, ethylene/vinyl acetate copolymers, cellulose derivatives such as nitrocellulose resins, acrylic resins, polyvinyl acetal resins, polyvinyl butyral resins, epoxy resins, phenoxy resins, polyurethane resins and polycarbonate polyurethane resins. It is preferred that polar groups (e.g., an epoxy group, $CO_2H$, OH, $NH_2$, $SO_3M$, $OSO_3M$, $PO_3M_2$, $OPO_3M_2$; M is hydrogen, an alkali metal or ammonium, and when there are plural M in one group, M may be the same or different) are introduced into the molecules of the above-described binders to improve further dispersibility and durability. The content of the polar group is in the range of preferably from $1 \times 10^{-6}$ to $1 \times 10^{-3}$ equivalent per 1 g of the polymer.

The above-described high molecular binders are used alone or in combination with several kinds. The conventional isocyanate type crosslinking agents are often added to the above binders for hardening them.

Oligomers of acrylate and monomers which are hardened by radiation exposure can be used as binders for the ester compounds of the present invention.

The present invention is particularly effective where the binder used in the magnetic layer of the magnetic recording medium is a polymer having preferably at least one of the following polar groups.

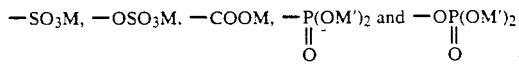

In the above formulae, M is a hydrogen atom, an alkali metal such as Li, Na, K or $NR_0$ ($R_0$ is a hydrogen atom, an alkyl, alkenyl or alkanol group having 1 to 22 carbon atoms and preferably 1 to 8 carbon atoms), and M' is a hydrogen atom, an alkali metal such as Li, Na, K, an alkyl group or $NR'_0$ ($R'_0$ is a hydrogen atom, an alkyl, alkenyl or alkanol group having 1 to 22 carbon atoms and preferably 1 to 8 carbon atoms) and is preferably —$SO_3M$.

The surface of the magnetic layer becomes extremely smooth by using the polymer having the above polar groups as a binder, and it is possible, therefore, to provide a magnetic recording medium having high electromagnetic characteristics. The conventional technology could not provide an excellent running durability under wide varieties of environmental conditions. However, it has become possible to provide a magnetic recording medium having the excellent electromagnetic characteristics and the sufficient running durability using the ester compounds used in the present invention.

The polymers which contain at least one of polar groups such as —COOH, —COONa, —$COONH_4$, —$SO_3Na$, —$SO_3K$, —$OPO_3Na$, —$OPO_3H_2$, —$OPO_3(NH_4)_2$, —$PO_3Na_2$ or —$PO_3H_2$ and a carbon-carbon unsaturated bond are preferably used. Such polymers include vinyl chloride copolymers, vinyl chloride and vinyl acetate copolymers, vinyl chloride and vinyl propionate copolymers, vinylidene chloride and vinyl acetate copolymers, or polyurethane resins.

The particularly preferable polar groups are —COOH and —$SO_3Na$ group. The content of the polar group is preferably from $1 \times 10^{-7}$ to $1 \times 10^{-3}$ equivalent per 1 g of the polymer, more preferably from $1 \times 10^{-6}$ to $5 \times 10^{-4}$ equivalent and most preferably from $1 \times 10^{-5}$ to $2 \times 10^{-4}$ equivalent. When the content thereof is outside of the above ranges, dispersibility of ferromagnetic particles decreases and electromagnetic characteristics also greatly decreases. The carbon-carbon unsaturated bonds of the present invention are present at the residual group of the unsaturated acid such as the acrylate residual group, the terminal vinyl residual group or maleic acid, and may be positioned at the side chain or the terminal of the main chain. The content of the unsaturated group is from $1 \times 10^{-5}$ to $1 \times 10^{-3}$ equivalent per 1 g of the polymer. When the content is outside the above ranges, hardenable property degrades or durability decreases.

The molecular weight of the polymer is from 3,000 to 50,000 and preferably from 8,000 to 30,000. When the molecular weight thereof is less than 3,000, it may easily happen that the magnetic layer becomes so strong that it tends to crack when it is bent, or the magnetic recording medium tends to curl by shrinkage upon hardening with radiation exposure. On the other hand, when the molecular weight thereof exceeds 50,000, the dissolubility of the polymer into the solvent tends to decrease. As a result, not only handling the polymer is inconvenient, but also dispersibility of ferromagnetic particles decreases, and enormous energy is needed for the hardening treatment. Additionally, the durability becomes insufficient and the running property also decreases.

The polymers having the above polar groups are preferably polyurethane resins, vinyl chloride copolymers or polyester resins, which may be used in combination with at least two kinds.

As basic polyvinyl chloride copolymers, there are, for example, polyvinyl chloride, vinyl chloride/vinyl acetate copolymers, vinyl chloride/vinyl acetate/maleic acid copolymers, vinyl chloride/vinyl acetate/vinyl alcohol copolymers, vinyl chloride/vinyl acetate/maleic acid/vinyl alcohol copolymers, vinyl chloride/vinylpropionate/vinyl maleate copolymers, vinyl chloride/vinyl propionate/vinyl alcohol copolymers, vinylidene chloride/vinyl acetate/maleic acid copolymers, vinylidene chloride/vinyl propionate/vinyl alcohol copolymers, vinyl chloride/vinyl acetate/acrylic acid copolymers, vinyl chloride/vinyl acetate/acrylic acid/vinyl alcohol copolymers and the saponified copolymers thereof can be used. The carbon-carbon unsaturated bond can be introduced by partial modification of a hydroxyl group or a carboxyl group in the polymer or of a hydroxyl group which is formed by the saponification of the polymer. As the examples of methods for introducing the carbon-carbon unsaturated bold, there are a reaction of a compound (e.g., glycidyl acrylate) having an epoxy ring and a compound having a carbon-carbon unsaturated bond with a part of a hydroxyl group of the polymer, and a reaction of a part of a hydroxyl group or a carboxyl group in the copolymer with an NCO group of polyfunctional isocyanate and a reaction of the above NCO group remained or groups with an active hydrogen compound having a (meth)acryloyl group (i.e., an acryloyl group and a methacryloyl group) such as hydroxyalkyl (meth)acrylates (e.g., (meth)acrylic acid, 2-hydroxyethyl (meth)acrylate, 2-hydroxypropyl (meth)acrylate, 2-hydroxybutyl (meth)acrylate), (meth)acrylamide or N-methyloyl (meth)acrylamide.

As the examples of methods for introducing the polar group, there is a reaction of a part of a hydroxyl group or a carboxyl group in the polymer or a part of a hydroxyl group which is formed by the saponification of the polymer with an NCO group of polyfunctional isocyanate, and a reaction of the NCO group remained or groups with a hydroxyl compound having a COOM group, an $SO_3M$ group or an $OPO_3M_2$ group. The introduction of the polar group can be simultaneously carried out together with the introduction of the carbon-carbon unsaturated bond. For example, it can be carried out by copolymerization of glycidyl (meth)acrylate with a vinyl compound such as vinyl chloride, and then by addition of a hydroxyl compound having a polar group to an epoxy ring. The synthetic examples of these resins are disclosed in JP-A-61-89207, JP-A-61-106605, JP-A-57-40744 and JP-A-59-8126. The resins used in the present invention should not be limited to these examples. As the example of commercially available resin used in the present invention, there is "MR 301" manufactured by Nippon Zeon Co., Ltd.

The urethane resin having a polar group and a carbon-carbon unsaturated bond can include, as the skeleton of main chain thereof, polyester, polyether, polyester ether, polycaprolactone, or polycarbonate. The most typical example of the skeleton is polyester. The examples of dibasic acids used for them include oxalic acid, malonic acid, succinic acid, glutaric acid, adipic acid, sebacic acid, dodecanoic acid, maleic acid, fumaric acid, itaconic acid, trimethyladipic acid, hexahydrophthalic acid, tetrahydrophthalic acid, phthalic acid, isophthalic acid, terephthalic acid and naphthalene dicarboxylic acid. The divalent alcohols include ethylene glycol, trimethylene glycol, tetramethylene glycol, pentamethylene glycol, hexamethylene glycol, octamethylene glycol, diethylene glycol, triethylene glycol, tetraethylene glycol, 2,2-dimethylolpropane-1,3-diol, 2,2-diethylpropane-1,3-diol, cyclohexane-1,3-diol, cyclohexane-1,4-diol, cyclohexane-1,4-dimethanol, cyclohexane-1,3-dimethanol, 2,2-bis(4-hydroxyethoxycyclohexyl)propane, 2,2-bis(4-hydroxyethoxyphenyl)propane and 2,2-bis(4-hydroxyethoxyethoxyphenyl)propane. The polyester skeleton of lactone type such as γ-butyrolactone, δ-valerolactone and ε-caprolactone can also be used. Further, carbonate esters such as 1,6-hexanediol, 1,8-octanediol or 1,10-decanediol can also be used for polycarbonate type.

The isocyanate capable of forming urethane bond includes polyisocyanate such as 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3-dimethylphenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate or these adducts of tolylenediisocyanate with trimethylolpropane. A part of the dibasic acid and the divalent alcohol can be replaced by trivalent or more acid and alcohol. The polar group and the carbon-carbon unsaturated bond can be at the terminal or side chain of polyurethane structure. The preferred examples of the polar group are COOH, $SO_3Na$ and $SO_3K$. As the examples of methods for introducing these groups, there are a method using trivalent or more acid or polar group-containing dibasic acid instead of the above dibasic acid, and a method in which urethane having an isocyanate group at the terminal thereof is reacted with an active hydrogen compound having one or more polar group and one or more (meth)acryloyl group and one or more OH group. The synthesis examples of these methods are disclosed in JP-A-59-174660, JP-A-59-223712, JP-A-60-35322, JP-A-60-119626, JP-A-60-120765, JP-A-61-77134 and JP-A-61-222028. The compounds used in the present invention should not be limited to these examples.

Further, vinyl monomers which are polymerizable by radiation exposure can be added, if desired, in the magnetic layer of magnetic recording medium of the present invention. The examples of the vinyl monomers include compounds having one or more carbon-carbon unsaturated bonds in the molecule thereof, such as (meth)acrylic acid esters, (meth)acrylamides, allyl compounds, vinyl ethers, vinyl esters, heterocyclic vinyl compounds, N-vinyl compounds, styrenes, acrylic acids, methacrylic acids, crotonic acids, itaconic acids or olefins. The preferred examples of these compounds are compounds having two or more methacryloyl groups, such as (meth)acrylates of polyethylene glycol (e.g., diethylene glycol di(meth)acrylate, triethylene glycol di(meth)acrylate, tetraethylene glycol di(meth)acrylate); trimethylolpropane tri(meth)acrylate; pentaerythritol tetra(meth)acrylate; dipentaerythritol penta(meth)acrylate; dipentaerythritol hexa(meth)acrylate; tris($\beta$-(meth)acryloyloxyethyl)isocyanurate; bis($\beta$-(meth)acryloyloxyethyl)isocyanurate; and a reaction product of polyisocyanate and a hydroxy(meth)acrylate compound; and poly(meth)acrylate having two or more functional groups. The monomer can be used alone or in combination. The examples of the polyisocyanate include 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3-dimethylphenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate and three adducts of tolylenediisocyanate with trimethylolpropane. The examples of the hydroxy(meth)acrylate compound include 2-hydroxyethyl(meth)acrylate and 2-hydroxypropyl(meth)acrylate.

In addition to the polar group-containing polymer, thermoplastic resins, thermosetting resins and reactive resins can be used as the binders for magnetic layer of the present invention.

As thermoplastic resins, those resins having an average molecular weight of from 10,000 to 20,000 and having a degree of polymerization of from about 200 to 2,000 are generally used. The examples of these thermoplastic resins include vinyl chloride/vinyl acetate copolymer resins (e.g., vinyl chloride/vinyl acetate copolymers, vinyl chloride/vinyl acetate/vinyl alcohol copolymers, vinyl chloride/vinyl acetate/maleic acid copolymers), vinyl chloride/vinylidene chloride copolymers, acrylic resins (e.g., vinyl chloride/acrylonitrile copolymers, vinylidene chloride/acrylonitrile copolymers, (meth)acrylate/acrylonitrile copolymers, (meth)acrylate/vinylidene chloride copolymers, (meth)acrylate/styrene copolymers, butadiene/acrylonitrile copolymers), cellulose derivatives (e.g., cellulose acetate butyrate, cellulose diacetate, cellulose triacetate, cellulose propionate, cellulose acetate propionate, nitrocellulose, cellulose acetate), various synthetic rubber type thermoplastic resins (e.g., polybutadiene, chloroprene, polyisoprene, styrene butadiene copolymers), polyurethane resins, polyvinyl fluoride, polyamide resins, polyvinylbutyrate, styrene/butadiene copolymers and polystyrene resins. These resins may be used alone or in mixture.

As thermosetting resins or reactive type resins, those resins having an average molecular weight of 200,000 or less when they are in the coating composition, and having the infinite molecular weight by a condensation reaction or an adduct reaction after coating are generally used. In this case, when these resins are hardened by heating, those that do not soften nor dissolve by heating before hardening are preferred. As examples of these resins, there are phenol/formalin/novolak resins, phenol/formalin/resol resins, phenol/furfural resins, xylene/formalin resins, urea resins, melamine resins, dry oil-modified alkyd resins, phenolic resin-modified alkyd resins, maleic acid resin-modified alkyd resins, unsaturated polyester resins, joint use of epoxy resins and hardening agents (e.g., polyamine, acid anhydride, polyamide resins), resins hardened with moisture having isocyanate polyether at the terminal, polyisocyanate prepolymer (e.g., a compound having at least three isocyanate groups in a molecule which is the reaction product of diisocyanate and low molecular weight triol, trimer and tetramer of diisocyanate), resins having polyisocyanate prepolymer and active hydrogen (e.g., polyester polyol, polyether polyol, acrylic acid copolymers, maleic acid copolymers, 2-hydroxyethylmethacrylate copolymers, p-hydroxystyrene copolymers). They can be used alone or in mixture.

It is preferred that the polymers having the above polar groups are used by mixing with the above-described polyisocyanate prepolymer (a polyisocyanate compound), whereby the magnetic layer becomes tough and running durability is improved.

The amount of the total binders to be used is generally from 10 to 100 parts by weight and preferably from 15 to 40 parts by weight per 100 parts by weight of ferromagnetic particles.

In the present invention, conventional lubricating agents can be used in combination.

As the lubricating agents used in combination, there are saturated and unsaturated fatty acids (e.g., myristic acid, stearic acid, oleic acid and so on); metal soaps; fatty acid amide; fatty acid esters which do not correspond to the present invention (fatty acid esters of polyhydric alcohols such as various monoesters, sorbitan or glycerin, esterified substance of polybasic acid); higher fatty acid alcohol; monoalkyl phosphate; dialkyl phosphate; trialkyl phosphate; paraffins; silicone oils; animal and vegetable oils; mineral oils; fluoride type oils; fluoride type esters; higher aliphatic amine; inorganic particles such as graphite, silica, molybdenum disulfide, or tungsten disulfide; resin particles such as polyethylene, polypropylene, polyvinyl chloride, ethylene/vinyl chloride copolymers or polytetrafluoroethylene; $\alpha$-olefin polymerized substance; unsaturated aliphatic hydrocarbons which are liquid at a normal temperature; and fluorocarbons.

The preferable amount of the lubricating agents to be used varies depending upon their usage, but is generally from 1/10 to 2 times per the ester compounds of the present invention.

These lubricating agents may be added at the time of preparing a magnetic coating composition, or these agents may be dissolved in an organic solvent after drying or radiation exposure and then coated directly on the surface of the magnetic layer or sprayed thereon.

As an organic solvent used upon dispersing and coating a magnetic coating composition, there are ketones such as acetone, methyl ethyl ketone, methyl isobutyl ketone or cyclohexanone; esters such as methyl acetate, ethyl acetate, butyl acetate, ethyl lactate or monoethyl ether of glycol acetate; ethers such as ethyl ether, glycol dimethyl ether, glycol monoethyl ether, dioxane or tetrahydrofuran; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene.

As materials for the nonmagnetic support, there are polyesters such as polyethylene terephthalate, or polyethylene-2,6-naphthalate; polyolefins such as polyethylene or polypropylene; cellulose derivatives such as cellulose triacetate; polycarbonate; polyimide; and polyamideimide. If desired, these resins may be metalized with metals such as aluminum, copper, tin or zinc.

The shape of the nonmagnetic support can be a film, a tape, a sheet, a disk, a card or a drum. Various materials are selected depending upon the shape thereof.

A so-called backing layer may be provided on the opposite surface (back surface) to the surface provided with a magnetic layer to prevent charging, print-through, and wow flutter, to improve the strength of a magnetic recording medium and to form the back surface matted.

The thickness of the support is generally from 3 to 100 $\mu$m and preferably from 3 to 20 $\mu$m in case of a magnetic tape, and generally from 20 to 100 $\mu$m in case of a magnetic disk.

It is preferred to further include inorganic particles having Mohs' hardness of 5 or more into the magnetic layer of the magnetic recording medium of the present invention.

The inorganic particles to be used are not particularly limited, so long as the particles have Mohs' hardness of 5 or more. As the examples of inorganic particles having Mohs' hardness of 5 or more, there are $Al_2O_3$ (Mohs' hardness 9), TiO (Mohs' hardness 6), $TiO_2$ (Mohs' hardness 6.5), $SiO_2$ (Mohs' hardness 7), $SnO_2$ (Mohs' hardness 6.5), $Cr_2O_3$ (Mohs' hardness 9) and $\alpha$-$Fe_2O_3$ (Mohs' hardness 5.5). These can be used alone or in mixture.

The most preferred inorganic particles are those having Mohs' hardness of 8 or more. When inorganic particles having Mohs' hardness of less than 5 are used, the inorganic particles easily come off from the magnetic layer, the head clogging tends to easily occur because of poor abrasive function for a head, and running durability decreases.

The content of the inorganic particles is generally from 0.1 to 20 parts by weight and preferably from 1 to 10 parts by weight per 100 parts by weight of ferromagnetic particles.

Besides the above inorganic particles, it is preferred to add carbon black [particularly carbon black having an average particle diameter of from 10 to 300 nm (nanometer; $10^{-9}$ m)] into the magnetic layer.

An example of the methods for preparing a magnetic recording medium of the present invention is described below.

At the beginning, ferromagnetic particles and binders, above-described ester compounds, and if desired, other filler and additives are mixed and kneaded with a solvent to prepare a magnetic coating composition. As a solvent used at mixing and kneading, those solvents that are generally used upon preparing a magnetic coating composition are used.

Methods for mixing and kneading are not particularly limited, and the order of adding each ingredient can be optionally selected.

Upon preparation of a magnetic coating composition, conventional additives such as dispersing agents, antistatic agents or lubricating agents can be used in combination.

As examples of the dispersing agents, there are fatty acid having from 12 to 22 carbon atoms, the salt thereof, the esterified compound thereof, the compound a part or all parts of the hydrogens of which are substituted by fluorine atoms, amide of the above fatty acid, aliphatic amine, higher alcohol, polyalkylene oxide alkyl phosphate, alkyl phosphate, alkylborate, sarcosinates, alkyl ether esters, trialkyl polyolefin, oxyquaternary ammonium salts and lecithin.

The dispersing agents are generally used in an amount of from 0.1 to 10 parts by weight per 100 parts by weight of ferromagnetic particles.

As examples of the antistatic agents, there are electroconductive particles such as carbon black or carbon black graft polymer; natural surface active agents such as saponin; nonionic surface active agents such as alkylene oxide type agents, glycerin type agents or glycidol type agents; cationic surface active agents such as higher alkyl amines, quaternary ammonium salts, pyridine and the salts of other heterocyclic compounds, phosphoniums or sulfoniums; anionic surface active agents such as carboxylic acid, phosphoric acid, or compounds having an acid group such as a sulfuric acid ester or a phosphoric acid ester; and amphoteric surface active agents such as amino acids, aminosulfonic acids, sulfuric acid esters and phosphoric acid esters of amino alcohols. When the above-described electroconductive particles are used as an antistatic agent, they are used in an amount of, for example, from 0.1 to 10 parts by weight per 100 parts by weight of the ferromagnetic particles, and similarly to the above, the surface active agents are used in an amount of from 0.12 to 10 parts by weight per 100 parts by weight of the ferromagnetic particles.

The above additives such as dispersing agents, antistatic agents or lubricating agents can be used for the above-described original purposes, but may be used for other purposes. For example, the dispersing agents can function as a lubricating agent or as an antistatic agent. Accordingly, it should be understood that the above classification of the additives due to their functions are not decisive. If additives having multifunctions are used, the additive amounts thereof should preferably be determined in light of multiple effects.

The thus-prepared magnetic coating composition is coated on the above-described nonmagnetic support. It can be coated directly or through an intermediate layer such as an adhesive layer on the nonmagnetic support. The intermediate layer referred to herein means a layer comprising an adhesive agent alone or a composite film layer comprising nonmagnetic fine particles such as carbon dispersed in a binder.

The binders used in the intermediate layer comprising carbon can be optionally selected from various binders used in the magnetic layer. The particle diameter of carbon is preferably from 10 to 50 nm (nanometer; $10^{-9}$ m), and the weight ratio of binder/carbon is preferably from 100/10 to 100/150. The thickness of the intermediate layer is from 0.1 to 2 $\mu$m in case of a layer containing an adhesive agent alone, and is from 0.5 to 4 $\mu$m in case of the composite layer containing nonmagnetic particles.

The lubricating agents which are the same or different from those contained in the magnetic layer can be added into the intermediate layer.

The detailed descriptions as to the method for dispersing the above ferromagnetic particles and binders and the method for coating them on a support are disclosed in JP-A-54-46011 and JP-A-54-21805.

The dry thickness of the thus-prepared magnetic layer is generally from about 0.5 to 10 μm and preferably from 0.7 to 6.0 μm.

When a magnetic recording medium is used in the shape of a tape, the magnetic layer thus-prepared on the nonmagnetic support is subjected to magnetic orientation to orientate ferromagnetic particles contained in the magnetic layer, and then dried. On the contrary, when the magnetic recording medium is used in the shape of a disk, the magnetic layer is subjected to non-orientation due to the magnetic field to eliminate anisotropy of the magnetic properties, and then, if desired, it is subjected to surface smoothing treatment.

The center line average (surface) roughness (Ra) of the magnetic layer of the present invention is preferably 0.1 μm or less (cutoff value: 0.25 μm). This value is defined by JIS B 0601.

In the present invention, it is preferable to irradiate radiation after coating a magnetic coating composition and providing calendering treatment. It is also possible to provide the calendering treatment after irradiation, and then it is possible to again irradiate radiation.

As radiation to be exposed to the magnetic layer of the present invention, there are electron beams, γ-rays, β-rays and ultraviolet rays, and electron beams are preferred. As an electron beam accelerator, a scanning type and nonscanning type can be applied. As to electron beams, accelerating voltage is from 100 to 500 kv and preferably from 150 to 300 kv and the absorption dose is from 1 to 20 Mrad and preferably from 2 to 10 Mrad. When the accelerating voltage is 100 kv or less, the amount of energy transmitted is short, and when it exceeds 500 kv, the efficiency of energy used for polymerization decreases, which is uneconomical. With the absorption dose of less than 1 Mrad, hardening reaction is not enough to obtain a desired strength of the magnetic layer, whereas with the absorption dose of more than 20 Mrad, the efficiency of energy used for hardening decreases, and the irradiated object generates heat, resulting in deformation of a support, which is also undesirable. In order to prevent the support from deforming, it is preferable to cool the irradiated object of the magnetic recording medium by a cooling drum which is put under the support being irradiated.

The novel feature and results of the present invention will be illustrated in more detail with reference to the following Examples. In the Examples, all parts are by weight.

EXAMPLE I-1

| | parts |
|---|---|
| Co-Containing FeO$_x$ Particles | 100 |
| (x = 1.4, average particle diameter: 0.3 μm × 0.03 μm) | |
| Vinyl Chloride Copolymer ("UMCH" manufactured by UCC) | 13 |
| Polyurethane Resin ("N-2304" manufactured by Nippon Polyurethane) | 4 |
| Cr$_2$O$_3$ (abrasive agent) | 5 |
| Carbon Black ("Asahi #80" manufactured by Asahi Carbon) | 5 |
| Ester Compound Shown in Table I-1 (additive amount is shown in Table I-2) | |
| Oleic Acid | 1 |
| Silicone Modified by Myristic Acid | 1.5 |
| Methyl Ethyl Ketone | 72 |
| Toluene | 72 |
| Methyl Isobutyl Ketone | 36 |

The above composition was put in a ball mill, mixed, kneaded and dispersed for 10 hours to disperse uniformly the ferromagnetic particles, and thereafter, 7 parts of polyisocyanate compound ("Ureakote B" manufactured by Higashinihon Toryou, #1 Clear for Mylar) was added thereto, and kneaded for 1 hour to prepare a coating composition for magnetic layer. Then, the coating composition was coated on a nonmagnetic polyethylene terephthalate film having a thickness of 75 μm and a width of 500 mm to provide a magnetic recording medium having a magnetic layer. The thickness of the magnetic layer after drying and calendering for surface smoothness was 2.0 μm. The thus-obtained magnetic recording medium was cut to prepare flexible disk having a diameter of 3.5 inches as a test sample.

TABLE I-1

No. 1: Butyl Tetraoctanate
$R_1 = 6$ $R_2 = 4$ $R = 4$     MW = 256
$$CH_3(CH_2)_5CH-COO(CH_2)_3CH_3$$
$$|$$
$$(CH_2)_3CH_3$$

No. 2: Octyl Pentanonate
$R_1 = 7$ $R_2 = 5$ $R = 8$     MW = 340
$$CH_3(CH_2)_6CH-COO(CH_2)_7CH_3$$
$$|$$
$$(CH_2)_4CH_3$$

No. 3: Lauryl Hexadecanoate
$R_1 = 8$ $R_2 = 6$ $R = 12$     MW = 424
$$CH_3(CH_2)_7CH-COO(CH_2)_{11}CH_3$$
$$|$$
$$(CH_2)_5CH_3$$

No. 4: Myristyl 2-Heptylundecanoate
$R_1 = 9$ $R_2 = 7$ $R = 14$     MW = 480
$$CH_3(CH_2)_8CH-COO(CH_2)_{13}CH_3$$
$$|$$
$$(CH_2)_6CH_3$$

No. 5: Stearyl 2-Heptylundecanoate
$R_1 = 9$ $R_2 = 7$ $R = 18$     MW = 536
$$CH_3(CH_2)_8CH-COO(CH_2)_{17}CH_3$$
$$|$$
$$(CH_2)_6CH_3$$

No. 6: Stearyl 2-Nonyltridecanoate
$R_1 = 11$ $R_2 = 9$ $R = 18$     MW = 592
$$CH_2(CH_2)_{10}CH-COO(CH_2)_{17}CH_3$$
$$|$$
$$(CH_2)_8CH_3$$

No. 7: Isopalmityl 2-Heptylundecanoate
$R_1 = 9$ $R_2 = 7$ $R = 16$     MW = 508
$$CH_3(CH_2)_8CH-COOCH(CH_2)_7CH_3$$
$$|\qquad\qquad\qquad |$$
$$CH_3(CH_2)_6 \quad (CH_2)_5CH_3$$

No. 8: Isostearyl 2-Heptylundecanoate
$R_1 = 9$ $R_2 = 7$ $R = 18$     MW = 536
$$CH_3(CH_2)_8CH-COOCH(CH_2)_7CH_3$$
$$|\qquad\qquad\qquad |$$
$$CH_3(CH_2)_6 \quad (CH_2)_8CH_3$$

No. 9: Isotridecyl 2-Heptylundecanoate
$$CH_3(CH_2)_8CH-COOCH_2(CH_2)_9C(CH_3)_3$$
$$|$$
$$(CH_2)_6CH_3$$

No. 10: Isostearyl 2-Heptylundecanoate
$R_1 = 9$ $R_2 = 7$ $R = 18$     MW = 536
$$CH_3(CH_2)_8CH-COOCH_2CH(CH_2)_2CHCH_2C(CH_3)_3$$
$$|\qquad\qquad\qquad\qquad |\qquad\quad |$$
$$CH_3(CH_2)_6 \qquad\quad CHCH_3\ \ CH_3$$
$$|$$
$$CH_2C(CH_3)_3$$

Regarding each sample thus obtained, the running durability and output thereof were measured in the following manner and evaluated. The results are shown in Table I-2.

(1) Running Durability

Using a floppy disk drive for a disk having a diameter of 3.5 inches ("OA-D32W", a trade name, produced by Sony Corporation), under the conditions of 5° C., 50% RH and 60° C., 20% RH and the cycle of humidity and temperature as shown below, the running durability was measured by continuously running each sample at 600 rpm, and was shown in terms of the number of passes when the output of the sample decreased to 80% of the initial output.

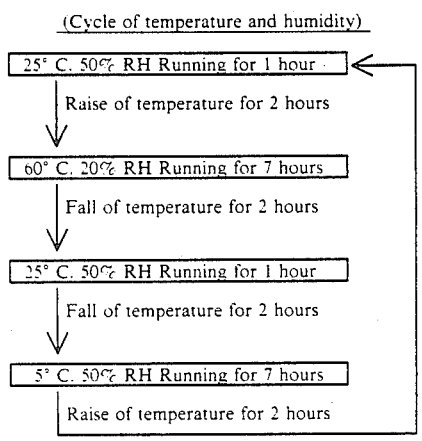

(Cycle of temperature and humidity)

(2) Output

The output of each sample was measured using the floppy disk drive as used above. The output was shown in terms of relative values when the output of a standard disk is assumed to be 100%.

TABLE I-2

| | | | (Invention) | | | |
|---|---|---|---|---|---|---|
| | Ester | | Running Durability (× 10,000 passes) | | | |
| Sample No. | Compound | Amount (parts) | Thermo-cycle | 5° C., 60% | 60° C., 20% | Output (%) |
| I-1 | No. 1 | 10 | 2,660 | 3,080 | 2,100 | 104 |
| I-2 | No. 2 | 10 | 2,850 | 3,290 | 2,220 | 103 |
| I-3 | No. 3 | 10 | 3,100 | 3,660 | 2,900 | 101 |
| I-4 | No. 4 | 10 | 3,230 | 3,580 | 3,050 | 100 |
| I-5 | No. 5 | 10 | 3,880 | 3,100 | 3,960 | 98 |
| I-6 | No. 6 | 10 | 3,800 | 3,020 | 3,900 | 101 |
| I-7 | No. 7 | 10 | 3,370 | 3,190 | 3,750 | 100 |
| I-8 | No. 8 | 10 | 3,240 | 2,890 | 3,780 | 99 |
| I-9 | No. 9 | 10 | 2,950 | 3,220 | 2,900 | 100 |

EXAMPLE I-2

The magnetic recording medium was prepared by coating, drying and smoothing under the same conditions as in Example I-1 except that the ester compound of Example I-1 had not been added into the coating composition at mixing and kneading. Then, 1 wt % solution of the above-described ester compound was overcoated on the surface of the thus-obtained magnetic recording medium by a bar overcoater having a wire diameter of 0.04 mm, and then dried. And the magnetic recording medium was cut in the same manner as in Example I-1 to prepare a flexible disk having a diameter of 3.5 inches as a test sample. The running durability and output of the sample were measured under the same conditions as in Example I-1.

The results as shown in Table I-3 were obtained.

TABLE I-3

| | | (Invention) | | | |
|---|---|---|---|---|---|
| | | Running Durability (× 10,000 passes) | | | |
| Sample No. | Ester Compound | Thermo-cycle | 5° C., 60% | 60° C., 20% | Output (%) |
| I-10 | No. 1 | 2,350 | 3,340 | 2,120 | 101 |
| I-11 | No. 3 | 3,290 | 3,450 | 2,600 | 99 |
| I-12 | No. 5 | 4,350 | 3,750 | 3,930 | 96 |
| I-13 | No. 7 | 3,860 | 3,770 | 3,620 | 99 |
| I-14 | No. 8 | 3,610 | 3,480 | 4,100 | 98 |
| I-15 | No. 10 | 2,980 | 2,770 | 3,600 | 100 |

COMPARATIVE EXAMPLE I-1

The magnetic recording media of flexible disks having a diameter of 3.5 inches of Sample Nos. I-16 to I-24 were obtained under the same conditions as in Example I-1 except that ester compounds of Nos. 11 to 19 were used instead of ester compounds of Nos. 1 to 9 as used in Example I-1.

TABLE I-4

No. 11: $R_1 = 4$  $R_2 = 2$  $R = 18$  $MW = 396$ $$CH_3(CH_2)_3\underset{\underset{CH_2CH_3}{|}}{CH}-COO(CH_2)_{17}CH_3$$

No. 12: $R_1 = 14$  $R_2 = 12$  $R = 18$  $MW = 648$ $$CH_3(CH_2)_{13}\underset{\underset{(CH_2)_{11}CH_3}{|}}{CH}-COO(CH_2)_{17}CH_3$$

No. 13: $R_1 = 9$  $R_2 = 7$  $R = 3$  $MW = 326$ $$CH_3(CH_2)_8\underset{\underset{(CH_2)_6CH_3}{|}}{CH}-COO(CH_2)_2CH_3$$

No. 14: $R_1 = 9$  $R_2 = 7$  $R = 24$  $MW = 620$ $$CH_3(CH_2)_8\underset{\underset{(CH_2)_6CH_3}{|}}{CH}-COO(CH_2)_{23}CH_3$$

No. 15: Ester Compound of Polybranched Fatty Acid  $MW = 536$ $$(CH_3)_3CCH_2CH-(CH_2)_2CHCOO(CH_2)_{17}CH_3$$
with branches $CH_3$ and $CH_2CH_3$-$CH_2$-$C(CH_3)_3$ No. 16: Ester Compound of Polybranched Fatty Acid and Polybranched Alcohol  $MW = 536$ $$(CH_3)_3CCH_2CH(CH_2)_2CHCOOCH_2CH(CH_2)_2CHCH_2C(CH_3)_3$$
with branches $CH_3$, $CH_2CH_3$, $CH_2CH_3$, $CH_3$ and $CH_2$-$C(CH_3)_3$, $CH_2$-$C(CH_3)_3$ No. 17: Ester Compound of Straight Chain Fatty Acid  $MW = 340$ $$CH_3(CH_2)_{16}-COO(CH_2)_3CH_3$$

No. 18: Ester Compound of Straight Chain Fatty Acid  $MW = 536$ $$CH_3(CH_2)_{16}-COO(CH_2)_{17}CH_3$$

No. 19: Ester Compound of Unsaturated Fatty Acid and Unsaturated Alcohol  $MW = 532$ $$CH_3(CH_2)_7CH=CH(CH_2)_7COO(CH_2)_8CH=CH(CH_2)_7CH_3$$

Regarding the thus-obtained sample as above, the running durability and output were evaluated under the same conditions of Example I-1. The results are shown in Table I-5.

TABLE I-5

(Comparative Example)

| Sample No. | Ester Compound | Amount (parts) | Running Durability (×10,000 passes) | | | Output (%) |
|---|---|---|---|---|---|---|
| | | | Thermo-cycle | 5° C., 60% | 60° C., 20% | |
| I-16 | No. 11 | 10 | 850 | 1,100 | 600 | 100 |
| I-17 | No. 12 | 10 | 1,400 | 680 | 1,650 | 101 |
| I-18 | No. 13 | 10 | 760 | 1,150 | 520 | 102 |
| I-19 | No. 14 | 10 | 1,690 | 880 | 1,730 | 104 |
| I-20 | No. 15 | 10 | 1,880 | 1,060 | 1,900 | 100 |
| I-21 | No. 16 | 10 | 1,500 | 7,720 | 1,780 | 102 |
| I-22 | No. 17 | 10 | 450 | 1,360 | 360 | 103 |
| I-23 | No. 18 | 10 | 300 | 300 | 3,600 | 99 |
| I-24 | No. 19 | 10 | 1,800 | 1,850 | 1,500 | 101 |

As is apparent from the results shown in Tables I-2 and I-3, the magnetic recording medium using the ester compound which has fatty acid portion of a branched alkyl group at the 2-position wherein the number of carbon atoms of $R_1$ and $R_2$ is within the specific range and alcohol portion having the number of carbon atoms within the specific range exhibited excellent running durability of 25,000,000 passes or more even under each condition and also exhibited no objectionable characteristics as to output.

On the other hand, the magnetic recording media (Sample Nos. I-16 to I-19) using the ester compound wherein the number of carbon atoms used for $R_1$, $R_2$ and R is outside of the range as defined in the present invention exhibited poor running durability of not more than 20,000,000 passes under each environmental condition, although decrease of output was not exhibited.

Further, the magnetic recording media (Sample Nos. I-20 and I-21) using the ester compound wherein $R_1$ and R are branched in the alcohol portion exhibited running durability of not more than 20,000,000 passes under any environmental conditions.

Still further, when the ester compound wherein the straight chain alkyl was used in the alcohol portion was used (Sample Nos. I-23 and I-24), the running durability was comparatively lower than that of the samples of the present invention. Particularly, in case of Sample No. I-23, dropouts often occurred.

EXAMPLE II-1

| | parts |
|---|---|
| Co-Modified FeO$_x$ Particles | 100 |
| (x = 1.4, average particle diameter: 0.3 μm × 0.33 μm) | |
| Vinyl Chloride Copolymer (one of two kinds as shown in Table II-1) | 13 |
| Polyester Polyurethane Resin (one of three kinds shown in Table II-2) | 4 |
| Cr$_2$O$_3$ (abrasive agent) | 5 |
| Carbon Black ("Asahi #80" manufactured by Asahi Carbon | 5 |
| Ester Compound (one of six kinds as shown in Table II-3) (additive amount is shown in Table II-4) | |
| Oleic Acid | 1 |
| Methyl Ethyl Ketone | 72 |
| Toluene | 72 |
| Methyl Isobutyl Ketone | 36 |

The above composition was put in a ball mill, mixed, kneaded and dispersed nearly for 10 hours to uniformly disperse the ferromagnetic particles. Then, 7 parts of polyisocyanate ("Collonate L", manufactured by Nippon Polyurethane Co., Ltd.) was added thereto, mixed and kneaded for 1 hour to prepare a magnetic coating composition. Then, the magnetic coating composition was coated on a nonmagnetic polyethylene terephthalate film having a thickness of 75 μm, width of 500 mm and a surface roughness (Ra) of 0.028 μm (cutoff value: 0.25 μm) to provide a magnetic recording medium having a magnetic layer. The thickness of the magnetic layer after drying and surface smoothing treatment by calendering was 2.5 μm. The thus-obtained magnetic recording medium was cut to prepare a flexible disk having a diameter of 3.5 inches as a test sample.

TABLE II-1

(Vinyl Chloride Copolymer)

| A: | Vinyl Chloride | 77 wt % |
|---|---|---|
| | —SO$_3$Na | 0.8 wt % |
| | Epoxy Group | 3.9 wt % |
| | Hydroxyl Group | 0.5 wt % |
| B: | Vinyl Chloride | 80 wt % |
| | Vinyl Acetate | 15 wt % |
| | Vinyl Alcohol | 5 wt % |
| | Degree of Polymerization | 400 |

TABLE II-2

(Polyester Polyurethane Resin)

| A: | Condensed Polyester —SO$_3$Na | (2 per 1 molecule) |
|---|---|---|
| | Average Molecular Weight | 40,000 |
| | Number Average Molecular Weight | 25,000 |
| | Initial Modulus of Elasticity | 100 kg/mm$^2$ |
| | Breaking Strength | 8 kg/mm$^2$ |
| | Breaking Elongation | 150% |
| B: | Polar Group | None |
| | Average Molecular Weight | 40,000 |
| | Number Average Molecular Weight | 25,000 |
| | Initial Modulus of Elasticity | 100 kg/mm$^2$ |
| | Breaking Strength | 8 kg/mm$^2$ |
| | Breaking Elongation | 150% |
| C: | Condensed Polyester —COOH | (1.5 per 1 molecule) |
| | Weight Average Molecular Weight | 40,000 |
| | Number Average Molecular Weight | 25,000 |
| | Initial Modulus of Elasticity | 100 kg/mm$^2$ |
| | Breaking Strength | 8 kg/mm$^2$ |
| | Breaking Elongation | 150% |

TABLE II-3

(Ester Compounds)

| | Chemical Formulae of Ester Compounds | Number of Carbon Atoms | |
|---|---|---|---|
| | | $R_5$ | $R_4$ |
| A | n-C$_{17}$H$_{35}$COO—C$_{18}$H$_{37}$ | 7 | 9 |
| B | n-C$_{19}$H$_{39}$COO—C$_{16}$H$_{33}$ | 6 | 8 |
| C | n-C$_{21}$H$_{43}$COO—C$_{16}$H$_{33}$ | 6 | 8 |
| D | n-C$_{23}$H$_{43}$COO—C$_{16}$H$_{33}$ | 6 | 8 |
| E | n-C$_{19}$H$_{39}$COO—C$_{18}$H$_{35}$ | 7 | 9 |
| F | n-C$_{21}$H$_{43}$COO—C$_{18}$H$_{35}$ | 7 | 9 |
| G | n-C$_{17}$H$_{35}$COO—C$_{20}$H$_{41}$ | 8 | 10 |
| H | n-C$_{17}$H$_{35}$COO—C$_{16}$H$_{33}$ | 6 | 8 |
| I | n-C$_{25}$H$_{51}$COO—C$_{16}$H$_{33}$ | 6 | 8 |
| J | n-C$_{25}$H$_{51}$COO—C$_{20}$H$_{41}$ | 8 | 10 |
| K | n-C$_{29}$H$_{59}$COO—C$_{16}$H$_{33}$ | 6 | 8 |
| L | n-C$_{29}$H$_{59}$COO—C$_{20}$H$_{41}$ | 8 | 10 |
| M | n-C$_{15}$H$_{31}$COO—C$_{16}$H$_{33}$ | 6 | 8 |
| N | n-C$_{13}$H$_{27}$COO—C$_{20}$H$_{41}$ | 8 | 10 |
| O | n-C$_{15}$H$_{31}$COO—C$_{20}$H$_{41}$ | 8 | 10 |
| P | n-C$_{17}$H$_{35}$COO—C$_{14}$H$_{29}$ | 5 | 7 |
| Q | n-C$_{23}$H$_{47}$COO—C$_{14}$H$_{29}$ | 5 | 7 |
| R | n-C$_{17}$H$_{35}$COO—C$_{22}$H$_{45}$ | 9 | 11 |
| S | n-C$_{23}$H$_{47}$COO—C$_{24}$H$_{49}$ | 10 | 12 |
| T | n-C$_{31}$H$_{16}$COO—C$_{18}$H$_{37}$ | 7 | 9 |

Twenty-nine samples of a magnetic recording medium were prepared by jointly using binders as shown in Tables II-1 and II-2 and the ester compounds as shown in Table II-3 and the combinations of which are shown in Table II-4.

TABLE II-4

| Sample No. | Ester Compound | (parts) | Vinyl Chloride Copolymer | Polyester Polyurethane Resin | Remarks |
|---|---|---|---|---|---|
| II-1 | A | 0.5 | A | A | Invention |
| II-2 | A | 3 | A | A | " |
| II-3 | A | 7.5 | A | A | " |
| II-4 | A | 10 | A | A | " |
| II-5 | A | 20 | A | A | " |
| II-6 | A | 30 | A | A | " |
| II-7 | B | 7.5 | A | A | " |
| II-8 | C | 7.5 | A | A | " |
| II-9 | D | 7.5 | A | A | " |
| II-10 | E | 7.5 | A | A | " |
| II-11 | F | 7.5 | A | A | " |
| II-12 | G | 7.5 | A | A | " |
| II-13 | H | 7.5 | A | A | " |
| II-14 | I | 7.5 | A | A | " |
| II-15 | J | 7.5 | A | A | " |
| II-16 | K | 7.5 | A | A | " |
| II-17 | L | 7.5 | A | A | " |
| II-18 | A | 7.5 | A | B | " |
| II-19 | A | 7.5 | A | C | " |
| II-20 | A | 7.5 | B | A | " |
| II-21 | A | 7.5 | B | B | " |
| II-22 | M | 7.5 | A | A | " |
| II-23 | N | 7.5 | A | A | Comparison |
| II-24 | O | 7.5 | A | A | Invention |
| II-25 | P | 7.5 | A | A | Comparison |
| II-26 | Q | 7.5 | A | A | " |
| II-27 | R | 7.5 | A | A | Invention |
| II-28 | S | 7.5 | A | A | Comparison |
| II-29 | T | 7.5 | A | A | " |

Regarding each sample thus obtained, the running durability, initial driving torque and surface smoothness of the magnetic layer were measured and evaluated in the following manner.

(1) Running Durability

Using a floppy disk drive for a disk having a diameter of 3.5 inches ("OA-D32W", a trade name, produced by Sony Corporation), the running durability was measured by continuously running each sample at 600 rpm under the conditions of high temperature and high humidity (70° C., 80% RH) and of the cycle of temperatures and humidities as shown below, and was shown in terms of the number of passes when the output of the sample decreased to 80% of the initial output.

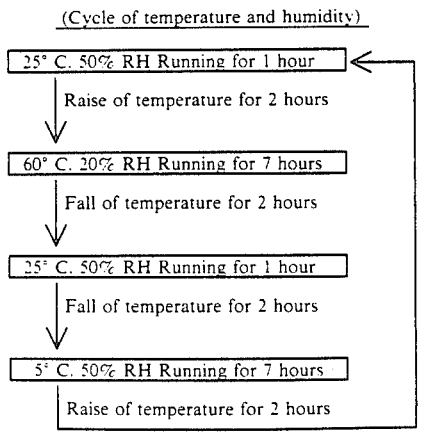

(Cycle of temperature and humidity)

25° C. 50% RH Running for 1 hour
↓ Raise of temperature for 2 hours
60° C. 20% RH Running for 7 hours
↓ Fall of temperature for 2 hours
25° C. 50% RH Running for 1 hour
↓ Fall of temperature for 2 hours
5° C. 50% RH Running for 7 hours
↓ Raise of temperature for 2 hours (2) Initial Driving Torque Each sample was made running for 30 minutes and was stopped for 10 minutes at 40° C., 80% RH, using the above-described floppy disk drive. Then, the torque (initial driving torque) when the disk started to rotate was measured, while the voltage was gradually increased.

(3) Surface Smoothness of a Magnetic Layer

The center line average (surface) roughness (Ra) was calculated at cutoff value of 0.25 μm by a light interference method was a digital optical profilometer (manufactured by WYKO).

The results are shown in Tables II-5 and II-6.

TABLE II-5

| | Running Durability | | |
|---|---|---|---|
| Sample No. | 70° C. 80% RH | Cycle of Temperature and Humidity | Remarks |
| II-1 | 10,000,000 passes | 10,000,000 passes | Invention |
| II-2 | 50,000,000 or more | 50,000,000 or more | Invention |
| II-3 | 50,000,000 or more | 50,000,000 or more | Invention |
| II-4 | 50,000,000 or more | 50,000,000 or more | Invention |
| II-5 | 45,000,000 | 50,000,000 or more | Invention |
| II-6 | 20,000,000 | 25,000,000 | Invention |
| II-7 | 50,000,000 or more | 50,000,000 or more | Invention |
| II-8 | 50,000,000 or more | 50,000,000 or more | Invention |
| II-9 | 50,000,000 or more | 50,000,000 or more | Invention |
| II-10 | 50,000,000 or more | 50,000,000 or more | Invention |
| II-11 | 50,000,000 or more | 50,000,000 or more | Invention |
| II-12 | 40,000,000 or more | 43,000,000 | Invention |
| II-13 | 30,000,000 | 35,000,000 | Invention |
| II-14 | 45,000,000 | 50,000,000 | Invention |
| II-15 | 40,000,000 | 43,000,000 | Invention |
| II-16 | 40,000,000 | 42,000,000 | Invention |
| II-17 | 40,000,000 passes | 42,000,000 passes | Invention |
| II-18 | 45,000,000 passes | 45,000,000 passes | Invention |
| II-19 | 45,000,000 | 45,000,000 | Invention |
| II-20 | 40,000,000 | 35,000,000 | Invention |
| II-21 | 20,000,000 | 15,000,000 | Invention |
| II-22 | 35,000,000 | 35,000,000 | Invention |
| II-23 | 10,000,000 | 12,000,000 | Comparison |
| II-24 | 30,000,000 | 35,000,000 | Invention |
| II-25 | 10,000,000 | 13,000,000 | Comparison |
| II-26 | 12,000,000 | 15,000,000 | Comparison |
| II-27 | 35,000,000 | 35,000,000 | Invention |
| II-28 | 35,000,000 | 30,000,000 | Comparison |
| II-29 | 30,000,000 | 20,000,000 | Comparison |

TABLE II-6

| Sample No. | Adsorption Torque (g · cm) | Center Line Average Roughness Ra (μm) | Remarks |
|---|---|---|---|
| II-1 | 90 | 0.007 | Invention |
| II-2 | 75 | 0.008 | Invention |
| II-3 | 60 | 0.007 | Invention |
| II-4 | 60 | 0.006 | Invention |
| II-5 | 75 | 0.007 | Invention |
| II-6 | 80 | 0.007 | Invention |
| II-7 | 65 | 0.007 | Invention |
| II-8 | 65 | 0.006 | Invention |
| II-9 | 75 | 0.008 | Invention |
| II-10 | 65 | 0.007 | Invention |
| II-11 | 70 | 0.008 | Invention |
| II-12 | 65 | 0.007 | Invention |
| II-13 | 60 | 0.006 | Invention |
| II-14 | 60 | 0.007 | Invention |
| II-15 | 70 | 0.006 | Invention |
| II-16 | 80 | 0.008 | Invention |
| II-17 | 90 | 0.007 | Invention |
| II-18 | 65 | 0.01 | Invention |
| II-19 | 69 | 0.006 | Invention |
| II-20 | 70 | 0.01 | Invention |
| II-21 | 65 | 0.007 | Invention |
| II-22 | 55 | 0.009 | Invention |

TABLE II-6-continued

| Sample No. | Adsorption Torque (g · cm) | Center Line Average Roughness Ra (μm) | Remarks |
|---|---|---|---|
| II-23 | 58 | 0.006 | Comparison |
| II-24 | 60 | 0.007 | Invention |
| II-25 | 60 | 0.007 | Comparison |
| II-26 | 70 | 0.008 | Comparison |
| II-27 | 80 | 0.007 | Invention |
| II-28 | 120 | 0.008 | Comparison |
| II-29 | 180 | 0.007 | Comparison |

It is clearly seen from the above results that the magnetic recording medium containing the ester compound wherein the number of carbon atoms of $R_3$ in the fatty acid portion is in the range of from 15 to 29, a branch is present at the 2-position of the alcohol portion and the total number of carbon atoms of $R_4$ and $R_5$ in the above-described formula (II) is from 14 to 20 exhibited running durability of 30,000,000 passes or more, and that particularly when the ester compound A wherein the number of carbon atoms of $R_3$ is 17 and the number of total carbon atoms of $R_4$ and $R_5$ is 16 is used, extremely excellent running durability of 50,000,000 passes or more was exhibited. Regarding the initial driving torque, the same tendency as that of the running durability was seen. In Sample Nos. II-23, II-25, II-26, II-28 and II-29 which do not meet the conditions of the structural features of the ester compound contained in the magnetic layer in the present invention, the running durability was inferior to that of samples of the present invention. Sample No. II-28 exhibited the running durability of 30,000,000 passes or more under any environmental conditions, but the adsorbing torque was 120 g.cm. It is clearly seen that even though a magnetic layer has a smooth surface, the magnetic recording medium of the present invention has running durability sufficiently enough to be practically used under the wide and various environmental conditions.

EXAMPLE III-1

| | parts |
|---|---|
| Ferromagnetic Metal Particles (Fe content: 99%, Ni content: 1%, specific surface area: 51 m²/g) | 100 |
| Vinyl Chloride Copolymer (vinyl chloride/vinyl acetate = 86/13 (weight ratio), degree of polymerization: 400, polar groups are shown in Table III-2) | 13 |
| Polyurethane Resin (butane diol/adipic acid/MDI = 5/4/1 (mole ratio), number average molecular weight: 40,000, the polar groups and the concentration thereof are shown in Table III-2) | 4 |
| $Cr_2O_3$ (abrasive agent) | 5 |
| Carbon Black ("Asahi #80", manufactured by Asahi Carbon) | 5 |
| Ester Compound (shown in Table III-1) | 10 |
| Oleic Acid | 1 |
| Myristic Acid Modified Silicone | 1.5 |
| Methyl Ethyl Ketone | 72 |
| Toluene | 72 |
| Methyl Isobutyl Ketone | 36 |

The above composition was put in a ball mill, mixed, kneaded and dispersed for 10 hours to uniformly disperse ferromagnetic particles and the dispersion having the viscosity of 10 poise was prepared. Then, 7 parts of polyisocyanate ("Urecoat B" manufactured by Higashi-Nihon Toryou, #1 Clear for Mylar) was added thereto, and mixed and kneaded for 1 hour to obtain a magnetic coating composition. Then, the magnetic coating composition was coated on both surfaces of a nonmagnetic polyethylene terephthalate film having a thickness of 75 μm, a width of 500 mm and the surface roughness Ra=0.028 μm to provide a magnetic recording medium having magnetic layers. The thickness of the magnetic layers after drying and calendering for surface smoothness was 2.0 μm. The thus-obtained magnetic recording medium was cut to prepare a flexible disk having a diameter of 3.5 inches as a test sample.

TABLE III-1

No. 1: Stearyl 2-Heptylundecanoate
$R_1 = 9$  $R_2 = 7$  $R = 18$   MW = 536

$$CH_3(CH_2)_8CH-COO(CH_2)_{17}CH_3$$
$$|$$
$$(CH_2)_6CH_3$$

No. 2: Octyl 2-Pentanonanate
$R_1 = 7$  $R_2 = 5$  $R = 8$   MW = 340

$$CH_3(CH_2)_6CH-COO(CH_2)_7CH_3$$
$$|$$
$$(CH_2)_4CH_3$$

No. 3: Fatty Acid Portion with "n + m = 14"
The center of the distribution is "n + m = 7".

$$CH(CH_2)_nCH(CH_2)_m-COOCH_2CH(CH_2)_7CH_3$$
$$|\qquad\qquad\qquad\qquad\qquad\quad|$$
$$CH_3\qquad\qquad\qquad\qquad(CH_2)_5CH_3$$

TABLE III-2

| Sample No. | Vinyl Chloride and Vinyl Acetate Resin | | Polyurethane Resin | | Ester Compound | Remarks |
|---|---|---|---|---|---|---|
| | Polar Group | Equivalent/g | Polar Group | Equivalent/g | | |
| 1 | —COOH | $5 \times 10^{-5}$ | No polar group | | No. 1 | Invention |
| 2 | —SO₃Na | $4 \times 10^{-5}$ | No polar group | | No. 1 | Invention |
| 3 | —SO₃Na | $2 \times 10^{-5}$ | No polar group | | No. 1 | Invention |
| 4 | —OH | $7 \times 10^{-6}$ | —SO₃Na | $8 \times 10^{-5}$ | No. 1 | Invention |
| 5 | No polar group | | —SO₃Na | $8 \times 10^{-5}$ | No. 1 | Invention |
| 6 | —COOH | $5 \times 10^{-5}$ | —SO₃Na | $8 \times 10^{-5}$ | No. 1 | Invention |
| 7 | —COOH | $5 \times 10^{-5}$ | —SO₃Na | $8 \times 10^{-5}$ | No. 2 | Invention |
| 8 | —COOH | $5 \times 10^{-5}$ | —SO₃Na | $8 \times 10^{-5}$ | No. 3 | Invention |

TABLE III-2-continued

| Sample No. | Vinyl Chloride and Vinyl Acetate Resin | | Polyurethane Resin | | Ester Compound | Remarks |
|---|---|---|---|---|---|---|
| | Polar Group | Equivalent/g | Polar Group | Equivalent/g | | |
| 9 | —OH | $7 \times 10^{-6}$ | No polar group | | No. 1 | Comparsion |
| 10 | No polar group | | No polar group | | No. 1 | Comparison |
| 11 | No polar group | | No polar group | | No. 3 | Comparison |
| 12 | —SO$_3$Na | $4 \times 10^{-5}$ | No polar group | | Butyl stearate | Comparison |
| 13 | —SO$_3$Na | $4 \times 10^{-5}$ | No polar group | | Oleyl oleate | Comparison |
| 14 | —SO$_3$Na | $4 \times 10^{-5}$ | No polar group | | Isocetyl stearate | Comparison |
| 15 | —COOH | $5 \times 10^{-5}$ | —SO$_3$Na | $8 \times 10^{-5}$ | Butyl stearate | Comparison |

Regarding each sample thus obtained, the running durability and output were measured and evaluated under the following conditions. The results are shown in Table III-3.

(1) Running Durability

Using a floppy disk drive for a disk having a diameter of 3.5 inches ("OA-D32W" manufactured by Sony Corporation), the running durability was measured by continuously running each sample at 300 rpm at 5° C. and 50% RH, 60° C. and 20% RH, and at the following cycle of temperatures and humidities, and was shown in terms of the number of passes when the output of the sample decreased to 80% of the initial output.

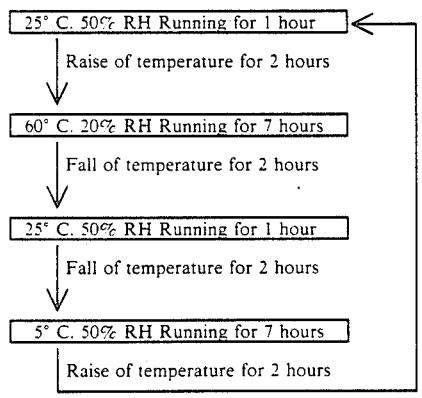

(Cycle of temperature and humidity)

25° C. 50% RH Running for 1 hour
↓ Raise of temperature for 2 hours
60° C. 20% RH Running for 7 hours
↓ Fall of temperature for 2 hours
25° C. 50% RH Running for 1 hour
↓ Fall of temperature for 2 hours
5° C. 50% RH Running for 7 hours
↓ Raise of temperature for 2 hours (2) Output Using a floppy disk drive for a disk having a diameter of 3.5 inches ("MPF-72", a trade name, produced by Sony Corporation), signals at 250 KHz were recorded on 79 track. Then, the signals were reproduced and the output was measured. The output was evaluated and shown in terms of relative values when the output of a standard disk is assumed to be 100%.

(3) Tap Durability

While the sample is made running at the condition of 60° C. and 20% RH, using a floppy disk drive having a diameter of 3.5 inches ("MPF-72W", produced by Sony Corporation), the operation that a head is loaded at a certain point of the track of the sample and is then unloaded at the another certain point of the track thereof, provided that the loaded and unloaded points are always the same points, is repeated until the output decreases to 80% of the initial output. The tap durability is shown in terms of the number of taps, that is, how many times the above operation was repeated.

TABLE III-3

| Sample No. | Running Durability ($\times$ 10,000 passes) | | | Tap Durability ($\times$ 10,000 passes) | Output (%) | Remarks |
|---|---|---|---|---|---|---|
| | Thermocycle | 5° C., 50% RH | 60° C., 20% RH | | | |
| III-1 | 3,000 or more | 3,000 or more | 3,000 or more | 20 or more | 180 | Invention |
| III-2 | 3,000 or more | 3,000 or more | 3,000 or more | 20 or more | 182 | " |
| III-3 | 3,000 or more | 3,000 or more | 3,000 or more | 20 or more | 183 | " |
| III-4 | 3,000 or more | 3,000 or more | 3,000 or more | 20 or more | 176 | " |
| III-5 | 3,000 or more | 3,000 or more | 3,000 or more | 20 or more | 175 | " |
| III-6 | 3,000 or more | 3,000 or more | 3,000 or more | 20 or more | 186 | " |
| III-7 | 3,000 or more | 3,000 or more | 3,000 or more | 20 or more | 185 | " |
| III-8 | 3,000 or more | 3,000 or more | 3,000 or more | 20 or more | 184 | " |
| III-9 | 2,800 | 3,000 or more | 2,500 | 15 | 170 | Comparison |
| III-10 | 1,900 | 2,500 | 1,200 | 5 | 160 | " |
| III-11 | 1,500 | 2,300 | 900 | 4 | 164 | " |
| III-12 | 600 | 2,000 | 300 | 18 | 178 | " |
| III-13 | 1,500 | 1,800 | 1,100 | 14 | 179 | " |
| III-14 | 2,000 | 1,500 | 2,400 | 20 or more | 182 | " |
| III-15 | 750 | 2,300 | 450 | 20 or more | 184 | " |

Samples (Sample Nos. III-1 to III-8) of the magnetic recording medium of the present invention using the ester compound represented by formula (III) wherein at least one of vinyl chloride and vinyl acetate resin and polyurethane resin which function as a binder has a polar group exhibited running durability of 28,000,000 passes or more and tap durability of 200,000 times or more.

On the other hand, although ester compounds represented by formula (I) or (III) are used, when the binder has a different polar group from that of the present invention (Sample No. III-9), and when the binder has no polar group (Sample Nos. III-10 and III-11), their running durability tends to be somewhat lower than that of the present invention, and particularly tap durability as well as output was lower than those of the present invention.

Further, although the binders having the same polar group as that of the present invention were used, when there is no branch in the fatty acid portion and the alcohol portion in the ester compound (Sample Nos. III-12, III-13, III-14 and III-15), the running durability was considerably decreased.

EXAMPLE IV-1

Preparation of Sample Nos. IV-1 to IV-18

The following composition was put in a ball mill and mixed and kneaded nearly for 20 hours.

| | parts |
|---|---|
| Fe Alloy Ferromagnetic Particles (Hc: 1,500 Oe, crystal size: 130 Å) | 100 |
| Binder Resin: | |
| Acrylate of Vinyl Chloride Copolymer (content of $-SO_3Na$: $1 \times 10^{-4}$ eq/g, molecular weight: 20,000, average content of acryloyl group: $5 \times 10^{-4}$ eq/g) | 13 |
| Urethane Acrylate (content of $-SO_3Na$: $5 \times 10^{-5}$ eq/g, molecular weight: 10,000, average content of acryloyl group: $1 \times 10^{-3}$ eq/g) | 8 |
| Fatty Acid Ester (shown in Tables IV-1 and IV-2) | 8 |
| $Al_2O_3$ (average particle diameter: 0.5 μm) | 10 |
| Carbon Black (average particle diameter: 30 μm) | 3 |
| Methyl Ethyl Ketone | 80 |
| Toluene | 80 |

After the above composition was mixed and kneaded, it was coated on a polyethylene terephthalate support having a thickness of 75 μm by a doctor blade to obtain a dry thickness of 2 μm, and dried for 1 minute at 100° C. Then, calendering for surface smoothing treatment was carried out on the thus-prepared magnetic layer. The magnetic layer was irradiated with electron beams at an accelerating voltage of 165 kv and with a beam electric current of 6 mA so that the absorption dose was 5 Mrad, and thereafter cut to obtain a floppy disk having a diameter of 3.5 inches.

As described above, 18 kinds of samples of the magnetic recording media using the ester compounds as shown in Table IV-1 were prepared.

TABLE IV-1

Ester Compounds Represented by Formula (II)

| Sample No. | Chemical Formula | $R_5$ | $R_4$ | Remarks |
|---|---|---|---|---|
| IV-1 | $n-C_{17}H_{35}COO-C_{18}H_{37}$ | 7 | 9 | Invention |
| IV-2 | $n-C_{19}H_{39}COO-C_{16}H_{33}$ | 6 | 8 | " |
| IV-3 | $n-C_{21}H_{43}COO-C_{16}H_{33}$ | 6 | 8 | " |
| IV-4 | $n-C_{17}H_{35}COO-C_{20}H_{41}$ | 8 | 10 | " |
| IV-5 | $n-C_{17}H_{35}COO-C_{16}H_{33}$ | 6 | 8 | " |
| IV-6 | $n-C_{25}H_{51}COO-C_{16}H_{33}$ | 6 | 8 | " |
| IV-7 | $n-C_{13}H_{27}COO-C_{18}H_{37}$ | 7 | 9 | Comparison |
| IV-8 | $n-C_{17}H_{35}COO-C_{14}H_{29}$ | 5 | 7 | " |
| IV-9 | $n-C_{23}H_{47}COO-C_{24}H_{49}$ | 10 | 12 | " |
| IV-10 | $n-C_{31}H_{61}COO-C_{16}H_{33}$ | 6 | 8 | " |

TABLE IV-2

Ester Compounds Represented by Formula (I)

| Sample No. | Chemical Formula | $R_1$ | $R_2$ | Remarks |
|---|---|---|---|---|
| IV-11 | $C_{13}H_{27}COO-C_8H_{17}$ | 7 | 5 | Invention |
| IV-12 | $C_{15}H_{31}COO-C_{12}H_{25}$ | 8 | 6 | " |
| IV-13 | $C_{17}H_{35}COO-C_{14}H_{29}$ | 9 | 7 | " |
| IV-14 | $C_{21}H_{43}COO-C_{18}H_{37}$ | 11 | 9 | " |
| IV-15 | $C_7H_{25}COO-C_{18}H_{37}$ | 4 | 2 | Comparison |
| IV-16 | $C_{27}H_{55}COO-C_{18}H_{37}$ | 14 | 12 | " |
| IV-17 | Ester compound of straight chain fatty acid $C_{17}H_{35}COOC_{11}H_{23}$ | | | " |
| IV-18 | Ester compound of unsaturated fatty acid and unsaturated alcohol $C_9H_{18}=C_8H_{15}COOC_9H_{17}=C_9H_{18}$ | | | " |

COMPARATIVE EXAMPLE IV-1

Preparation of Sample No. IV-19

A magnetic recording medium of a floppy disk having a diameter of 3.5 inches (Sample No. IV-19) was prepared under the same conditions as in Example IV-1 except that in the binder used in Example IV-1, acrylate of vinyl chloride copolymer wherein only $-COOH$ was removed and urethane acrylate wherein only $-SO_3Na$ was removed were used.

COMPARATIVE EXAMPLE IV-2

Preparation of Sample No. IV-20

Acrylate of vinyl chloride copolymer having removed only acryloyl group and urethane acrylate having removed only acryloyl group in the binder used in Example IV-1 were used. Further, hardening treatment was carried out at 50° C. for 3 days instead of providing radiation exposure. Besides the above, a magnetic recording medium of a floppy disk having a diameter of 3.5 inches (Sample No. IV-20) was prepared under the same conditions as in Example IV-1.

EXAMPLE IV-2

Preparation of Sample No. IV-21

A magnetic recording medium of a floppy disk having a diameter of 3.5 inches (Sample No. IV-21) was prepared under the same conditions as those of Example IV-1 except that acrylate of vinyl chloride copolymer having as a polar group $-SO_3Na$ in an amount of $2 \times 10^{-7}$ eq/g was used as acrylate of vinyl chloride copolymer in the binder used in Example IV-1.

EXAMPLE IV-3

Preparation of Sample No. IV-22

A magnetic recording medium of a floppy disk having a diameter of 3.5 inches (Sample No. IV-22) was prepared under the same conditions as those of Example IV-1 except that acrylate of vinyl chloride copolymer having as a polar group —SO₃Na in an amount of $8 \times 10^{-4}$ eq/g was used as acrylate of vinyl chloride copolymer in the binder used in Example IV-1.

EXAMPLE IV-4

Preparation of Sample No. IV-23

A magnetic recording medium of a floppy disk having a diameter of 3.5 inches (Sample No. IV-23) was prepared under the same conditions as those of Example IV-1 except that thermoplastic polyester polyurethane having —SO₃Na in an amount of $4 \times 10^{-5}$ eq/g was additionally added to the binder used in Example IV-1, and 8 parts of the above acrylate of vinyl chloride copolymer, 6 parts of the above urethane acrylate and 6 parts of the above thermoplastic polyester polyurethane were used.

EXAMPLE IV-5

Preparation of Sample No. IV-24

A magnetic recording medium of a floppy disk having a diameter of 3.5 inches (Sample No. IV-24) was prepared under the same conditions as those of Example IV-1 except that acrylate of vinyl chloride copolymer having as a polar group —COOH instead of —SO₃Na in an amount of $2 \times 10^{-4}$ eq/g was used as acrylate of vinyl chloride copolymer in the binder used in Example IV-1.

Regarding each sample of a magnetic recording medium of a floppy disk having a diameter of 3.5 inches, the initial output (2F output) and durability under the following temperature and humidity cycle were evaluated.

(Cycle of temperature and humidity)

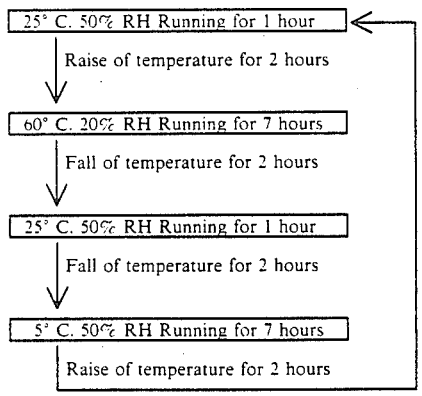

Using a floppy disk drive for a disk having a diameter of 3.5 inches ("OA-D32W" manufactured by Sony Corporation), the running durability was evaluated by continuously running each sample at 300 rpm, and was shown in terms of the number of passes when the output of the sample decreased to 80% of the initial output.

The values of the initial 2F output are relative values when the value of the initial 2F output of the sample of Example IV-1 is assumed to be 100%.

Using the floppy disk drive ("OA-D32W") at 40° C. and 80% RH, each sample was made running for 30 minutes and was stopped for 10 minutes. Then, while the voltage was gradually increased, the torque when the disk started to rotate was measured. This value was identified as an initial driving torque.

The center line average (surface) roughness (Ra) was calculated at cutoff value of 0.25 μm by a light interference method with a digital optical profilometer (manufactured by WYKO).

The results of evaluation on the characteristics of Sample Nos. IV-1 to IV-24 obtained in the above Examples and Comparative Examples are shown in Table IV-3.

TABLE IV-3

| Sample No. | Initial Output (%) | Durability (passes) | Initial Driving Torque (g · cm) | Smoothness (Ra) of Magnetic Layer (μm) | Remarks |
|---|---|---|---|---|---|
| IV-1 | 100 | 50,000,000 or more | 60 | 0.004 | Invention |
| IV-2 | 103 | 50,000,000 or more | 57 | " | " |
| IV-3 | 103 | 50,000,000 or more | 64 | " | " |
| IV-4 | 102 | 50,000,000 or more | 65 | " | " |
| IV-5 | 98 | 50,000,000 or more | 65 | " | " |
| IV-6 | 103 | 50,000,000 or more | 68 | " | " |
| IV-7 | 96 | 8,000,000 | 80 | 0.005 | Comparison |
| IV-8 | 97 | 10,000,000 | 85 | " | " |
| IV-9 | 97 | 11,000,000 | 85 | " | " |
| IV-10 | 95 | " | 85 | " | " |
| IV-11 | 100 | 50,000,000 or more | 65 | 0.004 | Invention |
| IV-12 | 103 | 50,000,000 or more | 60 | " | " |
| IV-13 | 99 | 50,000,000 or more | 65 | " | " |
| IV-14 | 99 | 50,000,000 or more | 65 | " | " |
| IV-15 | 97 | 6,000,000 | 90 | " | Comparison |
| IV-16 | 98 | 7,000,000 | 90 | " | " |
| IV-17 | 99 | 3,000,000 | 90 | " | " |
| IV-18 | 97 | 3,000,000 | 95 | " | " |
| IV-19 | 75 | 1,000,000 | 110 | 0.009 | " |
| IV-20 | 80 | 30,000,000 | 80 | 0.008 | " |
| IV-21 | 97 | 50,000,000 or more | 68 | 0.005 | Comparison |
| IV-22 | 99 | 50,000,000 or more | 65 | 0.004 | Invention |
| IV-23 | 96 | 50,000,000 or more | 68 | 0.005 | " |
| IV-24 | 98 | 50,000,000 or more | 67 | 0.004 | " |

As is apparent from the results of Table IV-3, a magnetic recording medium which is excellent in both running durability and electromagnetic characteristics could be obtained by using the binder and the fatty acid ester of the present invention and by providing radiation exposure.

On the other hand, when the fatty acid esters of which number of carbon atoms is outside the range defined in the present invention was used, the durability and the initial driving torque were decreased. (See Sample Nos. IV-7 to IV-10, Sample Nos. IV-15 and IV-16).

When the fatty acid esters having hydrocarbon group wherein there is no branch and the fatty acid esters having unsaturated bond chain were used, the durability was decreased and the initial driving torque was increased. (See Sample Nos. IV-17 and IV-18).

Further, in case when the binders having no polar group were used, and in case when radiation exposure was not done, not only running durability such as durability or initial driving torque but also the smoothness of a magnetic layer were decreased and the initial output was also reduced. (See Sample Nos. IV-19 and IV-20).

EXAMPLE V-1

A cobalt-nickel magnetic film (film thickness: 150 nm) was deposited on a polyethylene terephthalate film having a thickness of 13 μm by an oblique evaporation method in an oxygen gas flow to prepare a bulk of a magnetic recording medium. As a vapor source, electron beam vapor source was used. Cobalt-nickel alloy (Co content: 80 wt %, Ni content: 20 wt %) was charged therein, and the vapor deposition was carried out with an incidence angle of 50° at a vacuum degree of $5 \times 10^{-5}$ Torr. The ester compounds as shown in Table V-1 were dissolved in methyl ethyl ketone, and the resulting solution was coated in an amount of 14 mg/m² on the magnetic metal thin film of the bulk of the magnetic recording medium and dried to prepare Sample Nos. V-1 to V-10. Still durability of the thus-obtained magnetic tapes mounted on an 8 mm type VTR at 40° C. and 80% RH was checked and the results are shown in Table V-1.

Still durability is evaluated and shown in terms of the period of time (minute) until the reproduced image disappears after a pose button was pressed using a tape of 50 m length mounted on an 8 mm type VTR ("FUJIX-8 M6 Type" manufactured by Fuji Photo Film Co., Ltd.) wherein the controller for controlling the period of time at a still mode had been removed.

and modifications can be made therein without departing from the spirit and scope thereof.

What is claimed is:

1. A magnetic recording medium comprising a non-magnetic support having thereon a magnetic layer, wherein at least one of ester compounds represented by formula (I) is present in or on the magnetic layer,

wherein $R_1$ represents a straight chain, saturated alkyl group having 6 to 12 carbon atoms, $R_2$ represents a straight chain, saturated alkyl group having 4 to 10 carbon atoms, and R represents a branched or straight chain alkyl group having 4 to 22 carbon atoms.

2. The magnetic recording medium as claimed in claim 1, wherein said magnetic layer comprises ferromagnetic particles and binders.

3. The magnetic recording medium as claimed in claim 2, wherein said binders are polymers having at least one polar group selected from the group consisting of

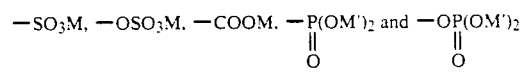

wherein M is H, Li, Na or $NR_0$ in which $R_0$ is H, an alkyl group, an alkenyl group or an alkanol group, and M' is H, Li, Na, an alkyl group, or $NR'_0$ in which $R'_0$ is H, an alkenyl group or an alkanol group.

4. The magnetic recording medium as claimed in claim 3, wherein said binders are a polymer having a polar group of $-SO_3M$.

TABLE V-1

| Sample No. | Material | Coated Amount (mg/m²) | Still Durability (min) | Remarks |
|---|---|---|---|---|
| V-1 | n-$C_{17}H_{35}$COO—$C_{16}H_{33}$ (See Table II-3) | 10 | 30 min or more | Invention |
| V-2 | n-$C_{17}H_{35}$COO—$C_{16}H_{33}$ (See Table II-3) | 20 | 30 min or more | Invention |
| V-3 | n-$C_{17}H_{35}$COO—$C_{16}H_{33}$ (See Table II-3) | 15 | 30 min or more | Invention |
| V-4 | n-$C_{19}H_{39}$COO—$C_{16}H_{33}$ | 15 | 30 min or more | Invention |
| V-5 | n-$C_{15}H_{31}$COO—$C_{16}H_{33}$ | 15 | 30 min or more | Invention |
| V-6 | Stearyl 2-heptyl-undecanoate (See Table I-1) | 15 | 30 min or more | Invention |
| V-7 | Isopalmityl 2-heptyl-undecanoate (See Table I-1) | 15 | 30 min or more | Invention |
| V-8 | n-$C_{23}H_{47}$COO—$C_{24}H_{49}$ (See Table II-3) | 15 | 10 | Comparison |
| V-9 | n-$C_{17}H_{35}$COO—$C_{14}H_{29}$ (See Table II-3) | 15 | 12 | Comparison |
| V-10 | $CH_3(CH_2)_{13}$CH—COO($CH_2)_{17}CH_3$<br>$\quad\quad\quad\quad\quad\;\;\|$<br>$\quad\quad\quad\quad\quad(CH_2)_{11}CH_3$<br>(See Table I-4) | 15 | 8 | Comparison |

As is apparent from the results shown in Table V-1, samples of a magnetic recording medium having a magnetic layer of a ferromagnetic metal thin film prepared according to the present invention exhibited superior characteristics.

While the invention has been described in detail and with reference to specific embodiments thereof, it will be apparent to one skilled in the art that various changes 5. The magnetic recording medium as claimed in claim 2, wherein said binders are a polymer having at least one polar group selected from the group consisting of

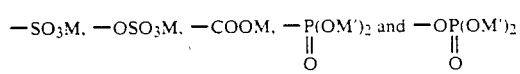

wherein M and M' are hydrogen, an alkali metal or ammonium and having at least one carbon-carbon unsaturated bond, and further said magnetic layer is exposed to radiation.

6. The magnetic recording medium as claimed in claim 5, wherein said binders are a vinyl chloride copolymer or a urethane resin, and the amount of the polar group is $1 \times 10^{-7}$ to $1 \times 10^{-3}$ equivalent per 1 g of the binders.

7. The magnetic recording medium as claimed in claim 1, wherein said ester compound represented by formula (I) is present in an amount of from 1 to 25 wt % based on the ferromagnetic particles in the magnetic layer.

8. The magnetic recording medium as claimed in claim 1, wherein a center line surface roughness of the magnetic layer is not more than 0.1 $\mu$m (cutoff value of 0.25 $\mu$m).

9. The magnetic recording medium as claimed in claim 1, wherein said magnetic layer is a ferromagnetic metal thin film.

10. The magnetic recording medium as claimed in claim 1, wherein said medium is a floppy disk.

11. The magnetic recording medium as claimed in claim 5, wherein said medium is a floppy disk.

* * * * *